United States Patent [19]
Chan

[11] Patent Number: 6,028,607
[45] Date of Patent: Feb. 22, 2000

[54] METHOD OF PRODUCING A SEQUENCE OF TRIANGLES FROM A VERTEX RASTER WITH AND WITHOUT HALF RESOLUTION EDGES WHILE DECOMPRESSING A COMPRESSED GEOMETRY STREAM

[75] Inventor: Jeffrey M. Chan, Mountain View, Calif.

[73] Assignee: Sun Microsystems, Inc., Palo Alto, Calif.

[21] Appl. No.: 09/007,525

[22] Filed: Jan. 15, 1998

[51] Int. Cl.$^7$ .................................................. G06T 17/20
[52] U.S. Cl. ............................ 345/419; 345/202; 345/511
[58] Field of Search ...................................... 345/418, 419, 345/420, 423, 441, 202, 203, 511

[56] References Cited

U.S. PATENT DOCUMENTS 5,748,202  5/1998  Nakatsuka et al. ...................... 345/514
5,905,502  5/1999  Deering ................................... 345/420

*Primary Examiner*—Mark R. Powell
*Assistant Examiner*—Thu Nguyen
*Attorney, Agent, or Firm*—Young Law Firm, P.C.

[57] ABSTRACT

A method of producing a sequence of triangles from a compressed geometry stream that includes an array of vertices includes steps of parsing vertices and pushing the parsed vertices into a buffer until the last vertex of the current row of the array is parsed and pushed. The first vertex of the current row is then re-used from the buffer and drawn. The first vertex of the next row is then parsed from the geometry stream, pushed into the buffer and drawn. Thereafter, it is determined whether a quad split bit is asserted. If the quad split bit is not asserted, the next vertex from the current row is parsed, pushed into the buffer, and drawn. The next vertex of the previous row is then re-used from the buffer and the re-used next vertex is drawn. If the quad split bit is asserted, the next vertex of the previous row is re-used from the buffer and drawn. The next vertex from the current row is then parsed and pushed into the buffer. Thereafter, the method returns to the determining step until the last vertex of the current row is reached, and returns to the first vertex re-using step until the last vertex of the array is reached. A triangle is formed from each three consecutive drawn vertices, to thereby create the sequence of triangles, starting from the beginning of each row. The raster may include one or more half-resolution edges, wherein alternate vertices are dropped and not drawn.

17 Claims, 14 Drawing Sheets

METHOD OF PRODUCING A SEQUENCE OF TRIANGLES FROM A VERTEX RASTER WITH AND WITHOUT HALF RESOLUTION EDGES WHILE DECOMPRESSING A COMPRESSED GEOMETRY STREAM

BACKGROUND OF THE INVENTION

1. Field of the Invention

The invention pertains to the field of computer graphics. More particularly, the present invention relates to a method of generating a sequence of triangles from a vertex raster with and without half resolution edges while decompressing a compressed geometry stream.

2. Description of the Related Art

Rendering images in modem computer graphics is a highly computationally intensive task. Indeed, the capabilities of modem graphics processors and the ever-increasing expectations of the public have both created and fueled the need for more detailed, realistic and complex renderings. Graphics processors typically contain at least two sections: a geometry section and a rasterizing section. The geometry section carries out the floating-point calculations to calculate the size, position and orientation of three-dimensional triangles, which are drawing primitives used in computer graphics. The three-dimensional triangles computed by the geometry section are then projected and rasterized onto the display device in two dimensions by the rasterizing section.

For realistic renderings, a number of characteristics must be specified for each constituent triangle of an object to be displayed. These characteristics allow highly detailed images having complex textures to be rendered on the display screen. Generating such detailed images and complex textures requires a large amount of storage to save and compute the characteristics during the rendering process. Also, a substantial amount of time is required to process these characteristics. What is needed, therefore, is a method of reducing the amount of memory needed to generate the triangles required to render such graphic images. What is also needed is a method that reduces the number of memory operations that are required to accomplish this goal, thus reducing the processing time required.

When rendering graphic images, it is often necessary to display textures of higher resolution next to textures of relatively lower resolution. The textures, therefore, must be adjusted accordingly, to allow a seamless transition between local areas of differing resolutions. What is also needed, therefore, is a method for efficiently manipulating the textures making up a graphic image to allow for regions of lower resolution to be rendered next to regions of relatively higher resolution.

Triangles may be specified in terms of their constituent vertices, three such vertices making up a triangle. These vertices, each representing texture values, may be sent to the geometry section as a compressed data stream that is called a compressed geometry stream, in the manner described in commonly assigned U.S. patent application Ser. No. 08/511,294, entitled "Compression Of Three Dimensional Graphics Data Using A Generalized Triangle Mesh Format", by Michael F. Deering, filed on Aug. 4, 1995, the disclosure of which is incorporated herewith in its entirety by reference.

Therefore, what is needed is a method of efficiently converting the compressed geometry stream into a sequence of triangles with or without lower resolution regions for texturing larger triangles, while simultaneously decompressing the geometry stream.

SUMMARY OF THE INVENTION

The present invention, therefore, provides an efficient method of reducing the amount of memory needed to generate the triangles required to render the graphic images. The present invention also provides a method to reduce a number of memory operations that are required to generate this sequence of triangles.

Furthermore, the present invention provides a method for efficiently generating a sequence of triangles from a geometry stream that allows for regions of relatively lower resolution to be calculated and rendered.

This invention also provides a method for efficiently converting a compressed geometry stream representing a patch of texture (hereafter a texture patch) into a sequence of triangles while simultaneously decompressing the geometry stream.

The method of generating a sequence of triangles from a geometry stream containing an array of vertices according to the principles of the present invention comprises the steps of:

parsing vertices from the geometry stream and pushing the parsed vertices into a mesh buffer until a last vertex of a current row of the array is parsed and pushed;

re-using a first vertex of the current row from the mesh buffer and drawing the re-used first vertex;

parsing a first vertex of a next row from the geometry stream, pushing the first vertex into the mesh buffer and drawing the first vertex;

determining if a quad split bit is asserted;

when the quad split bit is not asserted, parsing a next vertex from a current row of the array, pushing the parsed next vertex into the mesh buffer, drawing the parsed next vertex, and re-using a next vertex of a previous row from the mesh buffer and drawing the re-used next vertex;

when the quad split bit is asserted, re-using the next vertex of the previous row from the mesh buffer and drawing the re-used next vertex, parsing and drawing the next vertex of the current row of the array and pushing the parsed next vertex of the current row into the mesh buffer;

returning to the determining step until the last vertex of the current row is reached, and returning to the first vertex re-using step until a last vertex of the array of vertices is reached. In this manner, a triangle is formed from each three consecutive drawn vertices, to thereby create the sequence of triangles, starting from the beginning of each row.

None of the vertices of a first row of the array are drawn until the re-using step. A step of loading the first vertex of the current row into working registers from the mesh buffer following the first vertex re-use step may be included, to interpolate the first vertex of the next row therefrom. Each of the vertices may include a plurality of attributes. Along a half resolution edge, vertices that are pushed into the mesh buffer and drawn alternate with vertices that are not drawn and for which only placeholders devoid of attributes are pushed into the mesh buffer.

To create a half resolution edge along a bottom row of the array, every other vertex along the bottom row is dropped and a placeholder therefor is pushed into the mesh buffer. Remaining vertices of a bottom and next adjacent row are processed by omitting a first and every other next vertex re-using and drawing step, and by modifying the next vertex re-using step to re-use only vertices from the previous row that have not been dropped.

To create a top half resolution edge, upon reaching a top row of the array, the following steps are carried out until the last vertex of the array of vertices is reached:

re-using a first vertex of the previous row from the mesh buffer, parsing the first vertex of the top row from the geometry stream, drawing the parsed first vertex and pushing the parsed first vertex into the mesh buffer, re-using the next vertex of the previous row from the mesh buffer, parsing the next vertex from the geometry stream and dropping the parsed next vertex, allocating an entry in the mesh buffer as a placeholder for the dropped next vertex, and not drawing the dropped next vertex, parsing the next vertex from the geometry stream, drawing the parsed next vertex and pushing the parsed next vertex into the mesh buffer, and re-using the next vertex of the previous row from the mesh buffer. The first vertex of the previous row re-using step loads the attributes of the re-used vertex into working registers.

To create a left half resolution edge, upon reaching a last vertex of a first row of the array, the following steps are carried out until the last vertex of the array of vertices is reached:

re-using the first vertex of current row from the mesh buffer and drawing first vertex;

re-pushing the re-used first vertex into the mesh buffer;

parsing first vertex of next row from geometry stream, and dropping the parsed first vertex;

allocating an entry in the mesh buffer as a placeholder for the dropped first vertex;

parsing next vertex of current row from geometry stream, pushing the parsed next vertex into mesh buffer and drawing the parsed next vertex;

re-using the next vertex of the previous row from the mesh buffer and drawing the re-used next vertex;

returning to the determining step until a last vertex of the current row is reached;

re-using first vertex of previous row from mesh buffer and drawing the re-used first vertex;

re-using first vertex of current row from mesh buffer and not drawing the re-used first vertex;

parsing first vertex of next row from geometry stream and pushing parsed first vertex into the mesh buffer and drawing parsed first vertex;

re-using next vertex of previous row from the mesh buffer;

parsing next vertex of current row from geometry stream, pushing next vertex of current row into the mesh buffer and drawing pushed next vertex, and returning to the determining step until the last vertex of the current row is reached.

To create a right half resolution edge, upon reaching a second to last vertex of a second row of the array, the following steps are carried out until the last vertex of the array of vertices is reached:

re-using a last vertex of a previous row, and re-pushing re-used last vertex into the mesh buffer;

parsing last vertex of current row from the geometry stream, and completely dropping the last vertex of current row;

returning to the first vertex of the current row re-using step;

returning to the determining step until the second to last vertex of the current row is reached, parsing the last vertex of the current row from the geometry stream, pushing parsed last vertex into the mesh buffer, re-using last vertex of row that is two rows previous to current row, and returning to the first vertex of the current row re-using step, to the determining step and to the last vertex of previous row re-using step until the last vertex of the array is reached. When a vertex is completely dropped, no vertex and no placeholder mesh buffer pushing step is carried out.

Each re-using step may include a step of selectively reading a plurality of vertex attributes stored in the mesh buffer without re-loading working registers.

According to another embodiment, a method of generating a sequence of triangles from a compressed geometry stream containing an array of vertices, each of the vertices including a plurality of attributes, comprising the steps of:

traversing the array and selectively issuing, for each vertex of the array, one of a draw command and a don't draw command, and by carrying out at least one of a vertex drop step, to drop the attributes of selected vertices of the array, a mesh buffer pushing step, to push the attributes of selected vertices of the array into a mesh buffer, a mesh buffer re-use step, to read vertex attributes previously pushed into the mesh buffer, a working registers load step, to load vertex attributes into working registers, and a mesh buffer re-push step, to read vertex attributes previously pushed into the mesh buffer and to re-push the attributes in another location of the mesh buffer; and during the traversing step, decompressing the geometry stream by utilizing attributes of vertices loaded into the working registers, the loaded working registers storing vertex attributes to allow interpolation of attributes of subsequent vertices in the geometry stream therefrom. In this manner, a plurality of triangles is generated to form the sequence, each of the plurality of triangles being defined by three consecutive vertices for which a draw command has been issued, starting from the beginning of each row.

The vertex drop step drops attributes of selected vertices located on at least one edge of the array of vertices by pushing only a placeholder devoid of attributes into the mesh buffer, thereby creating at least one edge having dropped vertices, resulting in at least one half resolution edge defining triangles of larger size than triangles located in an interior of the array. The selected vertices are every alternate vertex along the at least one edge of the array of vertices. The working register load steps includes a step of selectively loading vertex attributes from the mesh buffer following a mesh buffer re-use step. The mesh buffer re-push step is carried out when subsequent mesh buffer push operations would overwrite vertex attributes that were previously pushed into the mesh buffer and that will be subsequently needed for later mesh buffer re-use operations. In this manner, a smaller mesh buffer may be used than would be possible without the mesh buffer re-push step. For each vertex of the first row of vertices of the array, a don't draw command is issued, and a mesh buffer pushing step is carried out, to store the attributes thereof into the mesh buffer for a subsequent mesh buffer re-use step.

BRIEF DESCRIPTION OF THE DRAWINGS

For a further understanding of the objects and advantages of the present invention reference should be made to the following detailed description, taken in conjunction with the accompanying figures, in which.

DESCRIPTION OF THE PREFERRED EMBODIMENTS

To allow a full appreciation of the present invention, the concept of vertex rasters is introduced. Vertex rasters are quadrilateral arrays of points and represent texture patches. Each point may represent a vertex of a triangle to be rendered. The vertex rasters may be dimensioned as, for example, 5×5, 9×9, 17×17 arrays, or most any other size that has an odd number of vertices along any half resolution edges. In the 5×5-vertex raster case, for example, the array of vertices includes five rows of five vertices, for a total of twenty-five vertices.

Vertex rasters, when rendered as a sequence of triangles, are disposed more or less contiguously relative to one another. When an area of lower resolution is to be rendered, the vertex raster must be modified to reflect this lower resolution. For example, when an area of lower resolution is to be disposed next to an area of relatively higher resolution, there preferably should be a seamless transition between the two areas. The vertex raster, therefore, should be adapted to produce larger triangles that will, when rendered, give the appearance of a transition to a region of lower resolution.

The vertices of the vertex raster preferably include a number of attributes that will determine the appearance of the object to be rendered, such as its color. Such attributes may include characteristics such as position, normal, color, displacement, alpha blending, highlights and the like. Some attributes may not be explicitly present in each vertex, but may be implicitly encoded in and interpolated from neighboring vertices of the array.

Indeed, the constituent vertices of such a vertex raster may be encoded in an absolute mode, in which the attributes associated with the vertex are completely specified without reference to another vertex. Alternatively, a vertex may be encoded in relative mode, in which its attributes are specified as a change from the attributes of a previous vertex in the geometry stream. Alternatively still, a vertex may be encoded in a double delta mode, in which the attributes of the vertex are specified as a change from the attributes of a previous vertex, this change being specified as a change from the changes used to generate the previous vertex from a still preceding vertex in the vertex raster.

Figure 1:
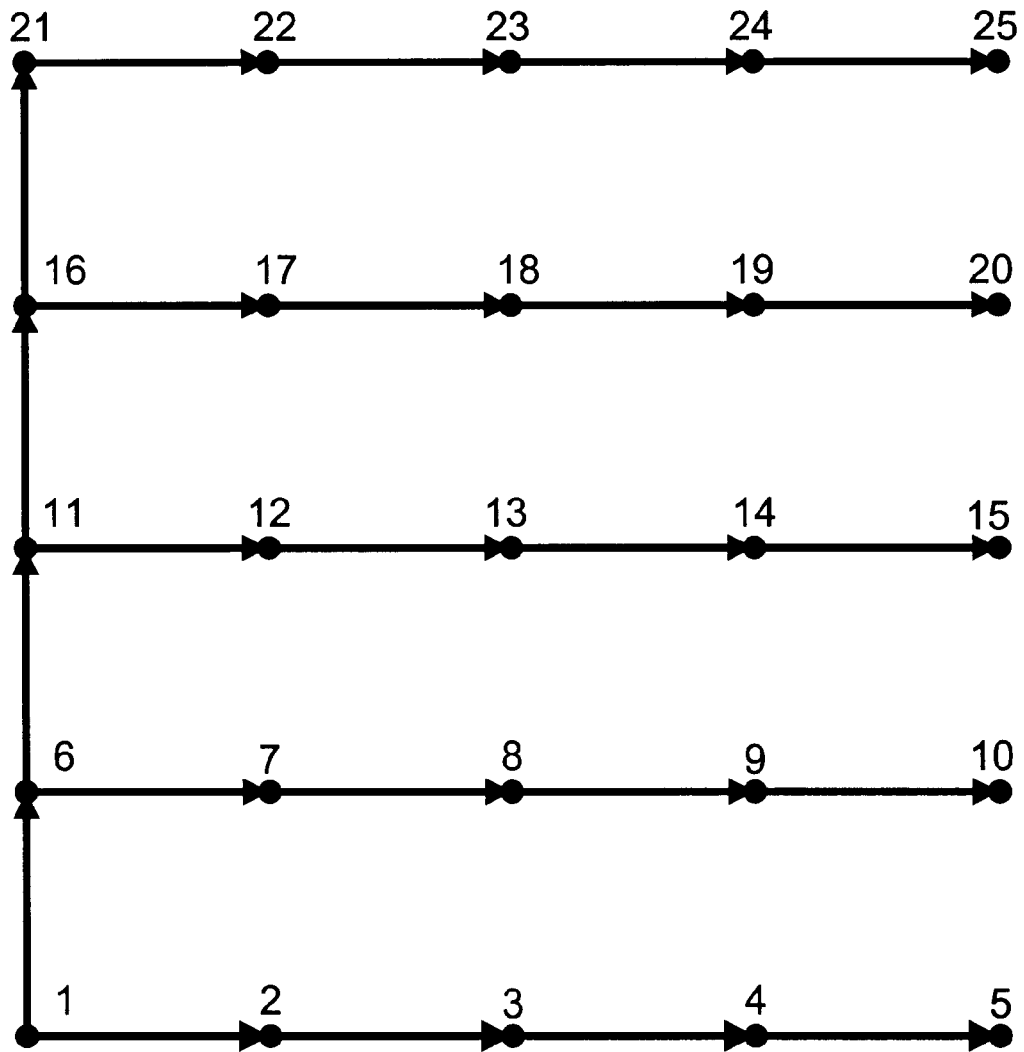
FIG. 1 is a graphical representation of a 5×5-vertex raster, and of the sequence in which the constituent vertices of the raster are ordered in the geometry stream.

Turning now to the drawings, FIG. 1 shows an example of a vertex raster. FIG. 1 illustrates the case of a 5×5-vertex raster, meaning that the raster consists of five rows of five vertices each. However, the present invention is equally applicable to other vertex raster dimensions, such as 9×9 or 17×17 or most any other size that includes an odd number of vertices on any half-resolution edge. However, for the sake of simplicity and ease of illustration, the present invention will be presented in terms of, but by no means limited to, a 5×5-vertex raster. The first vertex of the raster is located at the lower left corner of the vertex raster. The order of the vertices within the vertex raster, as well as the order of the vertices within the geometry stream, is illustrated by means of the numerals 1 though 25 shown above each of the vertices. Thus, vertex 1 will be the first vertex within the compressed geometry stream, followed by vertices 2 through 25. The arrows joining the vertices show the possible encoding dependence of one vertex upon one other or several other vertices. The attributes associated with vertex number 2, for example, may depend upon the attributes associated with vertex 1. Likewise, the attributes associated with vertex 6 may depend upon the attributes of vertex number 1. This ordering of the vertices and their possible interdependence impose constraints upon the decompression of the geometry stream as well as upon the efficient generation of a sequence of triangles from this vertex raster.

FIGS. 2 through 5 show vertex rasters from which a plurality of triangles have been formed. The triangles are defined by the vertices of the vertex raster. To smoothly join areas of higher resolution to areas of relatively lower resolution, comparatively larger triangles may be generated at one or more edges of the vertex raster. Edges that include such comparatively larger triangles are called half resolution edges. As shown in FIGS. 2 through 5, vertex rasters having a half resolution edge include triangles at an edge of the raster that are twice as large as triangles in the interior of the vertex raster.

Figure 2:
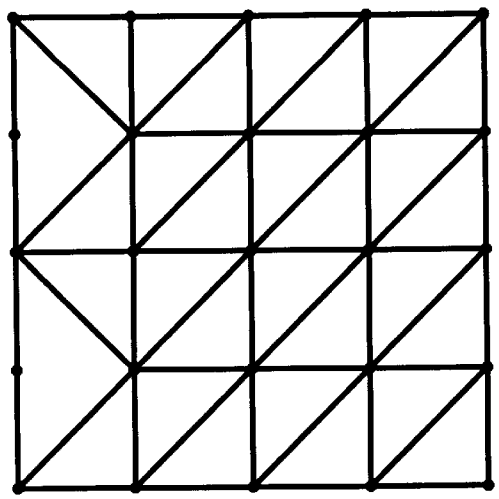
FIG. 2 is a graphical representation of a vertex raster having a left half-resolution edge.
Figure 3:
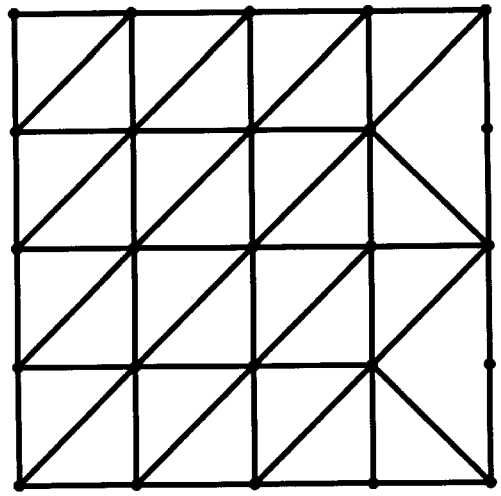
FIG. 3 is a graphical representation of a vertex raster having a right half-resolution edge.
Figure 4:
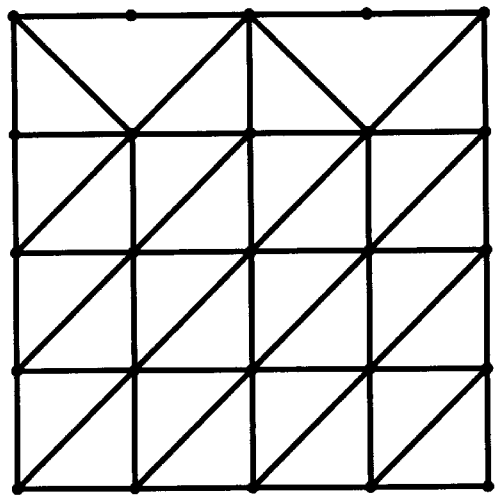
FIG. 4 is a graphical representation of a vertex raster having a top half-resolution edge.

FIG. 2 illustrates the case wherein the vertex raster includes a left half resolution edge. The left half resolution edge is formed by triangles that are twice as large as the other triangles of the vertex raster. These large triangles are formed by dropping alternating vertices on the left edge of the vertex raster. With reference also to FIG. 1, the two large triangles forming the left half resolution edge of the vertex raster of FIG. 2 are formed by vertices (1, 7, 11) and (11, 17 and 21), respectively. Vertices 6 and 16 are dropped and do not form part of any triangle. FIG. 3 illustrates a vertex raster having a right half resolution edge. The right half resolution edge of the vertex raster shown in FIG. 3 includes two large triangles formed by vertices (1, 9, 15) and (15, 19, 25), respectively. In this case, vertices 10 and 20 were dropped and do not form part of any triangle on the right half resolution edge. Likewise, FIG. 4 illustrates a vertex raster having a top half resolution edge. This top half resolution edge includes two large triangles formed by vertices (21, 17 and 23) and (23, 19, 25), respectively. In the case of FIG. 4, vertices 22 and 24 were dropped. In a similar fashion, the vertex raster illustrated in FIG. 5 includes a bottom half resolution edge formed by vertices (1, 7, 3) and (3, 9, 5), vertices 2 and 4 being dropped. It is to be understood that the 5×5-vertex raster is shown for the sake of simplicity and consistency only. Other size vertex rasters are possible, and the present invention is equally applicable to vertex rasters having dimensions other than 5×5.

Figure 17:
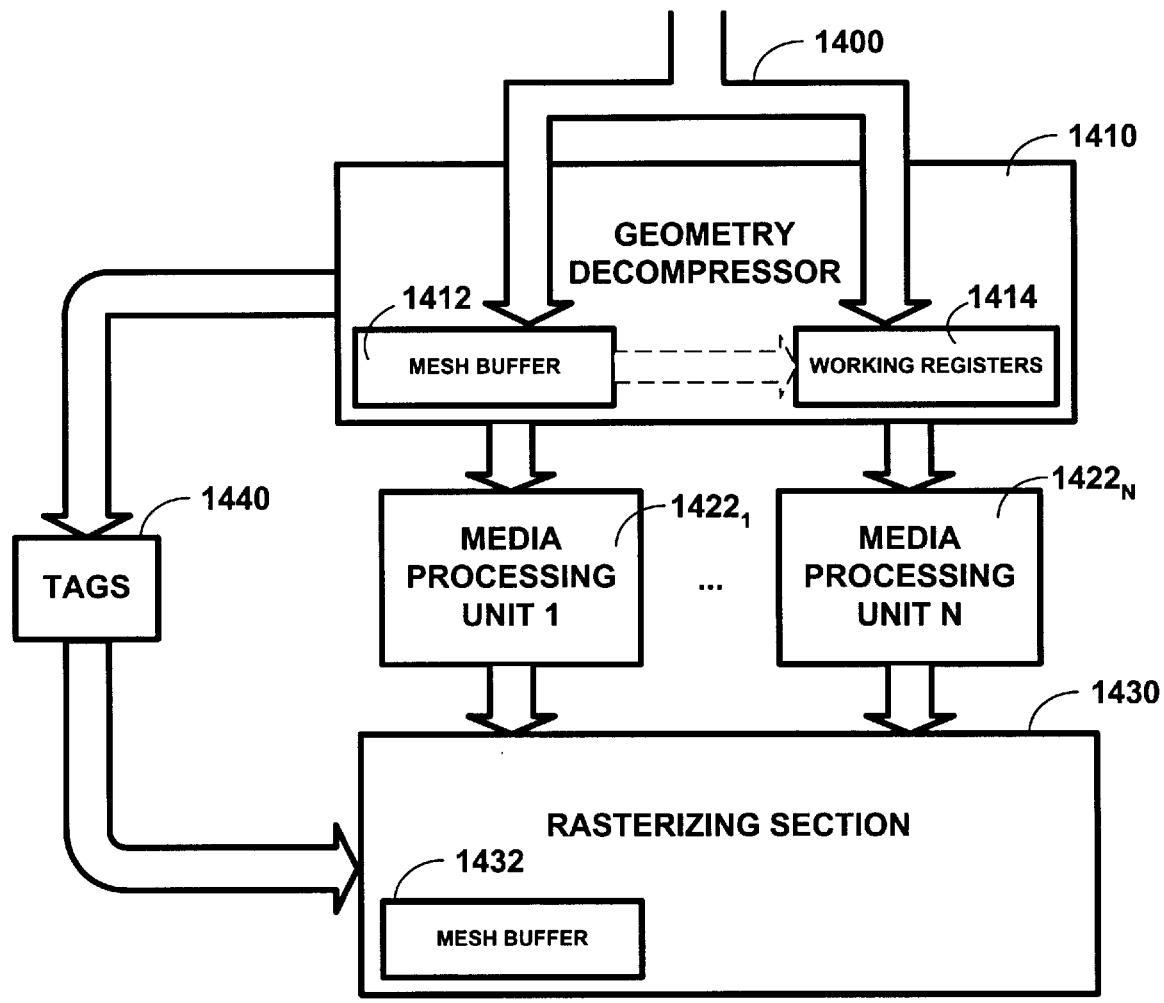
FIG. 17 is a block diagram for a system for implementing the method of generating a sequence of triangles according to an embodiment of the present invention.

FIG. 17 is a block diagram of a system including a geometry and rasterizing section system. The main functional units of the system are the geometry decompressor 1410, the media processing units $1422_1$ to $1422_N$ and the rasterizing section 1430. The geometry decompressor 1410 receives a compressed geometry data stream 1400 containing a plurality of points, which are the vertices of the triangles to be rendered. A plurality of attributes is associated with each of the points of the geometry stream 1400 to specify color, for example. The geometry decompressor (hereafter GDC) takes in the geometry stream, decompresses it and creates connectivity information and drawing instructions for generating the sequence of triangles. This connectivity information is passed on as tags 1440 to the rasterizing section 1430. The tags contain additional information that will allow the rasterizing section 1430 to reconstruct the vertices in the proper order after they have been processed by the media processing units $1422_1$ to $1422_N$. The rasterizing section 1430 will then set up and rasterize the triangles, taking into account the attributes of each constituent vertex and the commands and tags issued by the GDC 1410. Prior to sending the vertices to the rasterizing section 1430, the vertices are parsed and decompressed, and the connectivity information is generated. While the tags containing this connectivity information are sent to the rasterizing section 1430, the vertices themselves are sent to the media processing units $1422_1$ to $1422_N$. When objects are modeled as 3-D graphics, they are often constructed using their own coordinate system. These objects, however, must be rasterized upon the display, which has its own coordinate system. One of the functions of the media processing units $1422_1$ to $1422_N$, therefore, is to transform the object's local coordinate system into the display's coordinate system, usually by performing a matrix multiply operation. The rasterizing section, therefore, receives both the tags 1440 and the transformed vertices, and rasterizes the triangles onto the display.

The GDC 1410 includes a GDC mesh buffer 1412, which is used as temporary storage of vertex attributes during the generation of the triangle sequence, when the GDC 1410 traverses the vertex rasters. Also included in the GDC are working registers 1414, which are used to store attributes of vertices during the geometry stream decompression process. The rasterizing section 1430 also includes a mesh buffer 1432, which is used as temporary storage as the rasterizing section 1430 sets up and rasterizes the sequence of triangles. The working registers 1414 are loaded from the attribute values stored in the mesh buffer 1412 of the GDC 1410 and from the decompressed values of the compressed geometry stream 1400.

The present invention is also partly predicated upon four novel concepts. These four novel concepts are applied in the generation of the sequences of triangles from the vertex rasters, although not all four concepts are applied in every case. The following description will address each of these four concepts in turn.

The first such concept is the ability to produce vertices that are not drawn but pushed into a mesh buffer. Pushing a vertex into the mesh buffer is equivalent to writing the attributes of that vertex in a memory such as shown at 1412 and 1432 in FIG. 17. Indeed, the present invention provides for vertices that are not drawn, but merely pushed into the mesh buffer. The pushed vertices will then be available for subsequent re-use. In other words, the vertices pushed into the mesh buffer may later be read from the mesh buffer, by performing buffer read operations to retrieve the attributes of the pushed vertices. For example, the vertices of the vertex raster are received by the GDC in a set order, as set forth above relative to FIG. 1. As shown in FIG. 1, no triangles may be generated until at least the first vertex of the second row is parsed from the geometry stream. Therefore, it is crucial to have the ability to push vertices of the first row, for example, into the mesh buffer for later re-use, without drawing them. Thereafter, when parsing and processing the second row of vertices (vertices 6 through 10), the vertices 1 through 5 will be re-used, meaning that the previously pushed attributes corresponding to the vertices 1 through 5 will be accessed and read from the mesh buffer, as needed to generate triangles from the vertices of the first and second row.

The second such concept upon which the present invention is partly predicated concerns the mesh buffer 1412 and the working registers 1414, shown in FIG. 17. When traversing a vertex raster (processing each vertex of the vertex raster in turn), vertices are parsed in the order in which they are presented in the compressed geometry stream 1400. The attributes of each vertex are pushed into the mesh buffer 1412 for later re-use, as described above. The attribute data is loaded into the working registers 1414 as well. The working registers 1414 are used to decompress the geometry stream 1400 and to interpolate the attributes of each vertex. Normal mesh buffer re-use operations load the working registers. It takes time, however, to load the working registers 1414. Therefore, it is desirable to limit the loading of attributes into the working registers from mesh buffer re-use operations to be as few as possible. This entails loading only the attributes of those vertices into the working registers 1414 that are necessary for decompressing the geometry stream. This will limit the time required to load the working registers 1414 to a minimum. To that end, the present invention envisages carrying out selected mesh buffer re-use operations without loading the working registers 1414 with the attribute values read from the mesh buffer. Indeed, there are instances in the present invention where a vertex has already been parsed from the compressed geometry stream 1400, and is no longer needed to interpolate the attributes of the vertices that follow it. In that case, it becomes unnecessary to re-load the working registers 1414 with the attributes obtained via the mesh buffer re-use operation, as its attributes are no longer needed to produce later vertices. Thus, the second novel concept applied in the present invention is the ability to perform a mesh buffer re-use operation without loading the working registers 1414 in the GDC 1410 with the values read from the mesh buffer 1412.

The third such concept applied in the present invention relates to the ability to push vertices that have no associated attributes into the mesh buffer 1432. Indeed, there are occasions when it is desirable to push a vertex into the mesh buffer 1432 that does not have any attributes associated therewith. Such a vertex, for example, might be a vertex that is dropped to produce a larger triangle of a half resolution edge. Since this vertex will not be rasterized by the rasterizing section 1430, it is unnecessary to push its attributes, if any, into the rasterizing section 1430's mesh buffer, shown at 1432 in FIG. 17. However, if such a vertex were not pushed into the mesh buffer 1432, the order of the vertices in the vertex raster might be perturbed, requiring complex processing to account for the dropped vertex. Therefore, rather than dropping the vertex and skipping it in its entirety, the present invention allocates an entry for the dropped vertex in the rasterizing section 1430's mesh buffer 1432, thus keeping the entries therein consistent with the GDC's mesh buffer 1412. This maintains the integrity of the vertex raster by maintaining a fixed offset between each constituent vertex in the vertex raster. A vertex that does not include any attributes, but is nevertheless pushed in to the mesh buffer 1432, therefore, acts like a placeholder within the mesh buffer 1432 for the dropped vertex. This ability to push a vertex without associated attributes into the rasterizing section 1430's mesh buffer 1432 also saves in processing time, as loading the mesh buffer 1432 with attributes that will never be used takes time. On the other hand, pushing a vertex without attributes into such a mesh buffer 1432 is significantly faster and more efficient. There is one case, however, where a vertex is dropped in its entirety and no placeholder is pushed into the mesh buffer, as when the vertex raster includes a right half resolution edge. This will be discussed in detail below.

According to one embodiment of the present invention, the GDC 1410 controls both the mesh buffer 1412 of the GDC 1410 as well as the mesh buffer 1432 of the rasterizing section 1430. In another embodiment, the attributes of each vertex are pushed into the mesh buffer 1412 of the GDC 1410, regardless of whether a particular vertex is to be dropped. This greatly simplifies the traversal of the vertex raster by the GDC 1410.

Lastly, the fourth such concept applied in the present invention addresses the need for minimizing, wherever possible, the amount of storage space required in generating the sequence of triangles. Indeed, the fourth concept relates to the ability to re-push vertex attributes obtained from a mesh buffer re-use operation back into another location in the mesh buffers 1412 and 1432. The mesh buffers of the GDC 1410 and of the rasterizing section 1430, shown at reference numbers 1412 and 1432 of FIG. 17, respectively, may be configured as FIFO (First In, First Out) memories. These FIFO memories are designed, according to the present invention, to be as small as possible. It follows that vertex attributes that must be available for later re-use during the vertex raster traversal may be overwritten by subsequently pushed vertex attributes. Therefore, to prevent such overwriting, those entries in the mesh buffers 1412 and 1432 which would become overwritten by later-pushed attributes are read from the mesh buffers 1412 and 1432 and re-pushed into another location thereof, to insure that they will be available for a later mesh buffer re-use.

Figure 6:
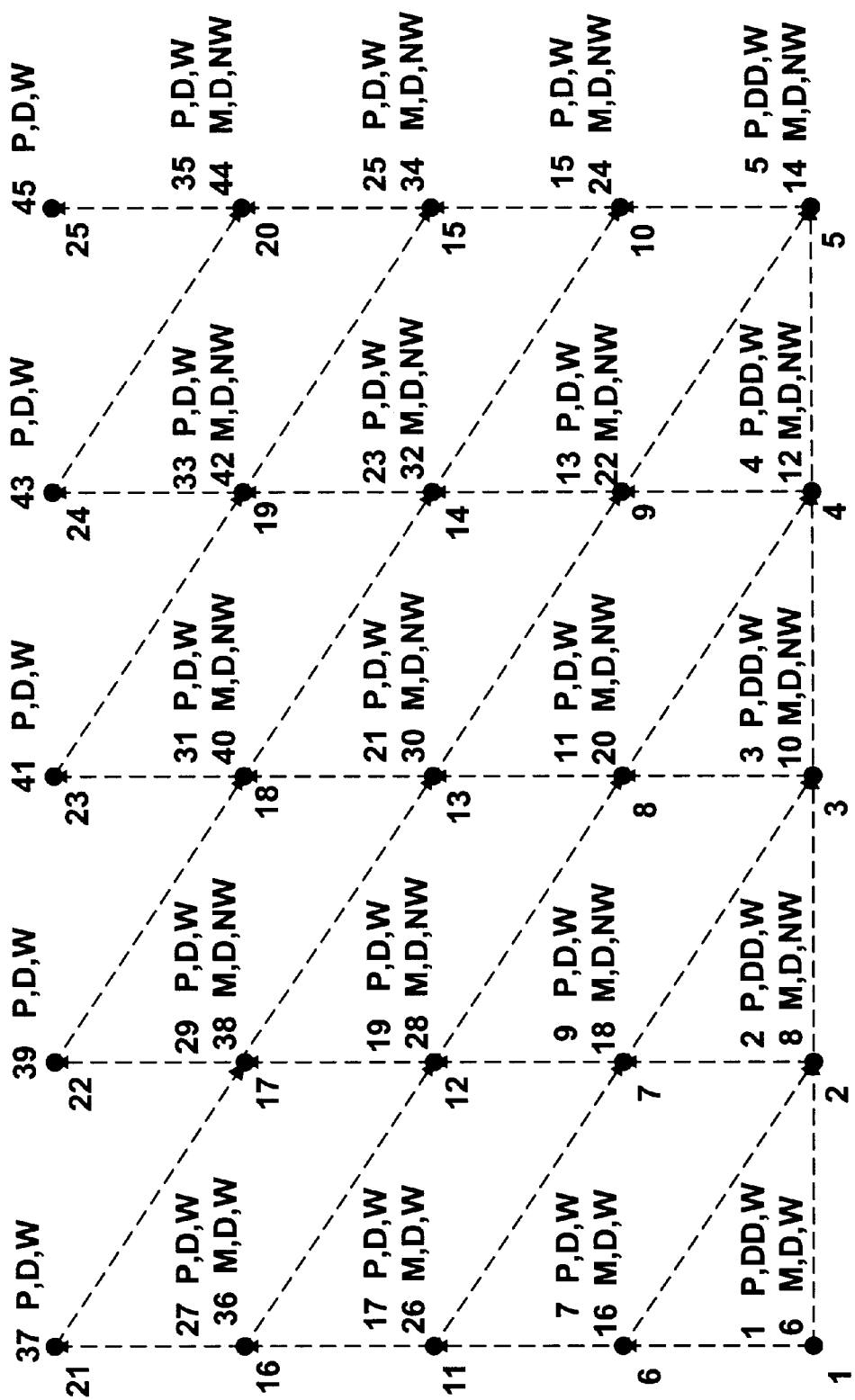
FIG. 6 shows a vertex traversal for a 5×5-vertex raster without any half-resolution edges, and with all quad split bits asserted, according to an embodiment of the present invention.
Figure 7:
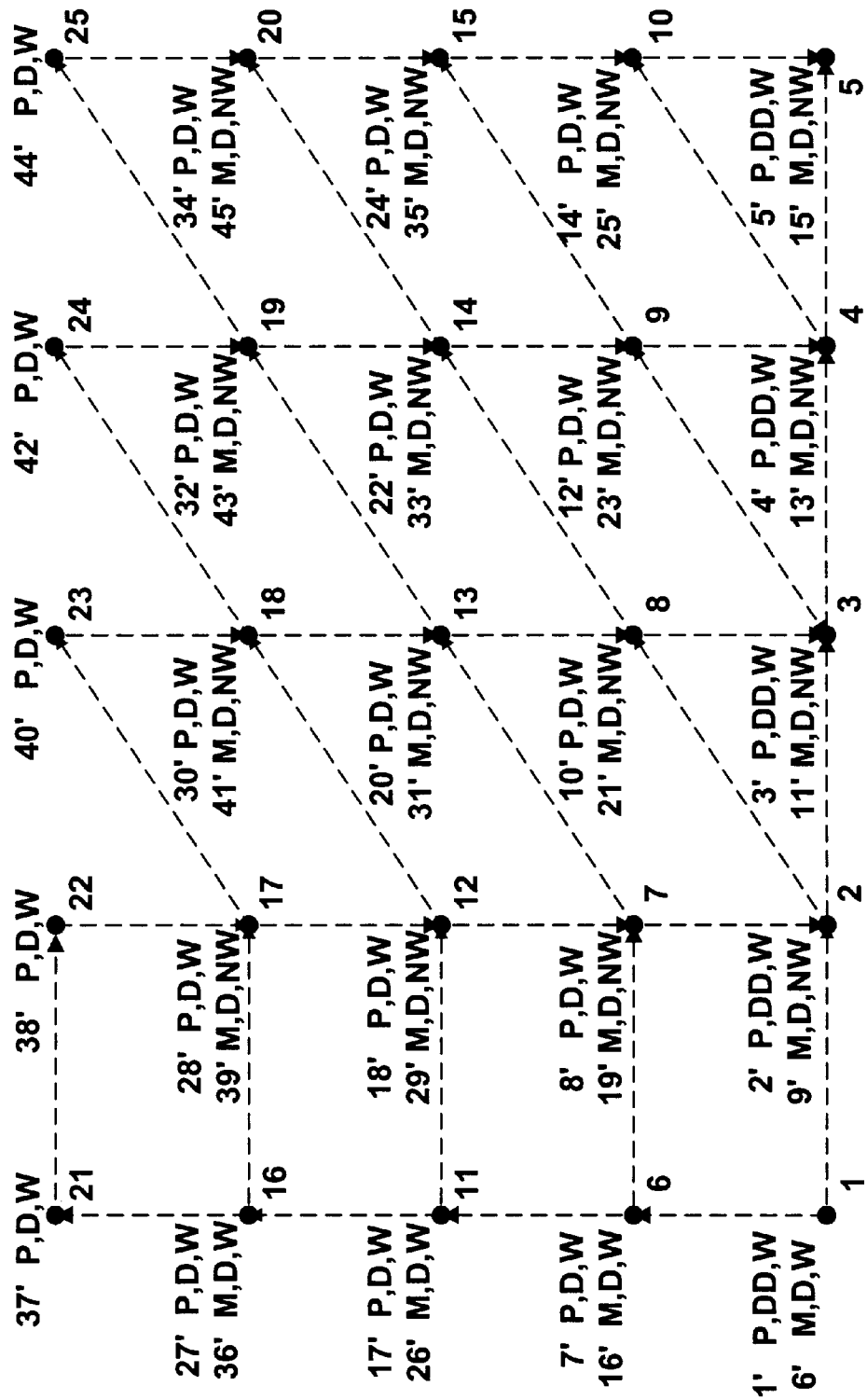
FIG. 7 shows a vertex traversal for a 5×5-vertex raster without any half-resolution edges, and with all quad split bits not asserted, according to an embodiment of the present invention.

The simplest vertex traversal, according to the present invention, occurs when the vertex raster does not contain any half resolution edges. Such a traversal is shown in FIGS. 6 and 7, which illustrate vertex raster traversals according to an embodiment of the present invention for a 5×5-vertex raster without any half-resolution edges. Referring collectively to FIGS. 6 and 7, each of the filled dots represents a vertex, and each of the vertices may include a plurality of attributes. The numbers 1 though 25 below each vertex are the vertex numbers, and also correspond to the order of arrival of each of the vertices 1 through 25 in the compressed geometry stream 1400. Therefore, the first vertex in the geometry stream 1400 is vertex number 1, and the last vertex is vertex 25, in the 5×5 vertex raster case. The numbers 1 though 45 in FIG. 6 and 1' through 45' in FIG. 7 that are followed by the codes P, DD, D, M, W, NW, which represent the order of processing the vertices when traversing the vertex raster. Hereafter, these numbers will be called processing numbers. The dash-lined arrows joining the vertices are indicative, together with the processing numbers, of the path taken by the GDC 1410 as it traverses the vertex raster to generate the connectivity information. This connectivity information, in turn, will allow the rasterizing section 1430 to generate and rasterize the sequence of triangles formed by the vertices of the raster.

The code P designates a push operation, to write the vertex attributes of the current vertex into the mesh buffers 1412 and 1432. The code DD is an instruction to the rasterizing section 1430 that the current vertex is not to be drawn. For example, no triangles may be formed until the second row (vertices 6 though 10 in the 5×5 vertex raster illustrated in FIG. 6) is reached. Therefore, the GDC 1410, for each vertex parsed from the first row, issues a DD (Don't Draw) command for each of the vertices of the first row (vertices 1 through 5). The code D is a command issued to the rasterizing section 1430 to draw the current vertex, as it is to form part of a triangle. The code M refers to a mesh buffer re-use, meaning that the attributes for the current vertex are to be read from the mesh buffers 1412 and 1432, as they have previously been pushed therein. Lastly, the code W refers to a working registers 1414 load operation, whereas NW means do not load the working registers 1414.

Figure 8:
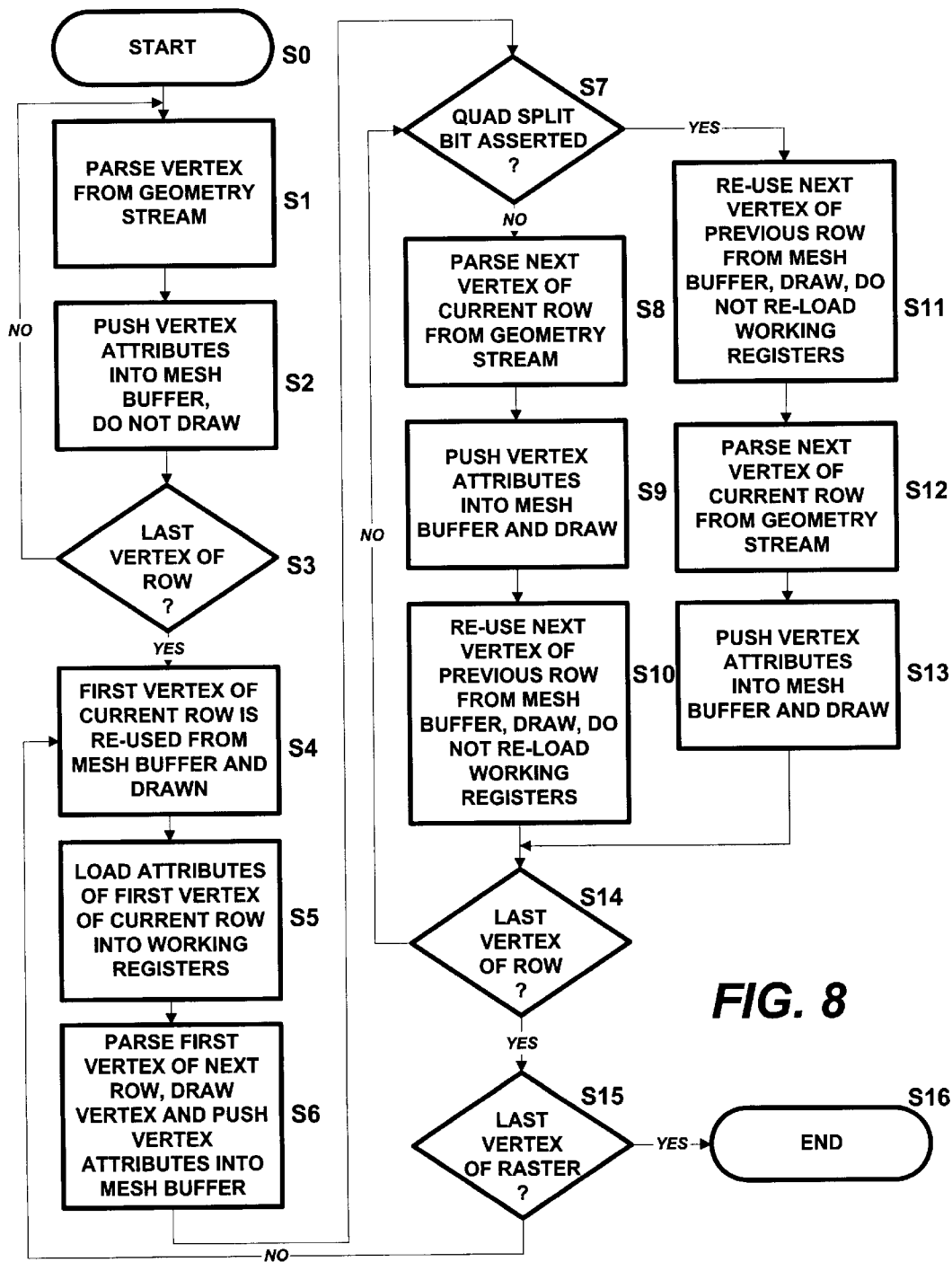
FIG. 8 is a flow diagram showing a sequence of steps for traversing the vertex rasters shown in FIGS. 6 and 7, according to an embodiment of the present invention.

FIG. 8 illustrates a method for the generation of the connectivity information that will allow the rasterizing section 1430 to rasterize the sequence of triangles, according to an embodiment of the present invention. Referring collectively now to FIGS. 6, 7 and 8, the method according to an embodiment of the present invention starts at step S0. At step S1, the $1^{st}$ vertex is parsed from the compressed geometry stream 1400. At step S2, the vertex is pushed into the mesh buffer 1412 and 1432, but is not drawn, as it is accompanied by the codes P, DD. At step S3, it is determined whether the last vertex of the row has been parsed. If not, the remaining vertices of the row; namely, vertices 2 through 5, are parsed from the compressed geometry stream 1400, pushed into the mesh buffers 1412 and 1432 and not drawn.

These vertices will be used later, but they need to be parsed from the compressed geometry stream 1400 first.

Each time a new vertex is parsed form the compressed geometry stream 1400, and its attributes pushed into the mesh buffers 1412 and 1432, the attributes are also loaded into the working registers 1414, so that the attributes of later vertices in the geometry stream may be interpolated therefrom, to decompress the geometry stream 1400. However, not all mesh buffer re-use operations load the working registers, according to the second concept described above. Indeed, only when a mesh buffer re-use operation acts upon the first vertex of a row, are the working registers 1414 loaded. This is because, according to the embodiment of the vertex raster shown in FIG. 1, the attributes of vertex number 6 may depend upon the attributes of vertex number 1. For the same reasons, the working registers 1414 are loaded upon carrying out a mesh buffer re-use operation on vertices 6, 11 and 16, as their attributes may be required to derive the attributes for vertices 11, 16 and 21, respectively.

When the end of the row is reached, at the YES branch of step S3, the first vertex; namely, vertex 1 is re-used from the mesh buffers 1412 and 1432 and drawn, as shown at step S4. This means that the attributes of vertex 1 are read from the mesh buffers 1412 and 1432, and that the rasterizing section 1430 is to draw the vertex. The working registers 1414 are loaded in step S5, as the attributes of this vertex may be needed to interpolate of the first vertex of the next row, such as vertex 6. This re-used vertex, at processing number 6 in FIG. 6 and 6' in FIG. 7, is also the start of the triangle sequence, and is drawn. The first vertex of the next row is then parsed, at processing numbers 7 and 7', from the compressed geometry stream 1400, as shown at step S6 in FIG. 8, is pushed into the mesh buffers 1412 and 1432, and is drawn. The next vertex to form the first triangle will then come from either the second vertex of the previous row, as shown in FIG. 6 at processing number 8, or the second vertex in the current row, as shown at processing number 8' in FIG. 7, depending upon a quad split bit. The quad split bit determines the orientation of the diagonal dividing line dividing four vertices (a quad), such as the four vertices 2, 3, 7 and 8, for example. In FIG. 6, the quad split bit is asserted, and the diagonal dividing line for these vertices runs from vertex number 3 to vertex number 7. In contrast, all of the quad split bits are not asserted in FIG. 7. Therefore, the diagonal dividing line for vertices 2, 3, 7 and 8 runs from vertex 2 to vertex 8. For purposes of clarity, the quad split bits are asserted throughout the entire vertex raster traversal of FIG. 6 and not asserted throughout the vertex traversal of FIG. 7. However, this need not be the case. Indeed, the quad split bits may switch from a not asserted state to an asserted state many times during a vertex raster traversal, or not switch at all, as is the case of FIGS. 6 and 7. In the event of a quad split bit switch from an asserted (FIG. 6) to a non-asserted state (FIG. 7) during a vertex raster traversal, the GDC 1410 would simply continue the processing from its current position within the vertex raster onward, following the primed processing numbers (1', 2'. . . 45') of FIG. 7, and switching back to processing the vertices following the non-primed processing numbers of FIG. 6 when encountering asserted quad split bits. This situation is illustrated in FIG. 8 at step S7, wherein it is determined whether the quad split bit is asserted.

If the quad split bit is not asserted, step S8 is carried out, whereupon the next vertex of the current row is parsed from the compressed geometry stream 1400, as shown at processing number 8' in FIG. 7. This parsed vertex is then pushed into the mesh buffers 1412 and 1432 and drawn, as shown at step S9 of FIG. 8. Completing the second triangle, the next vertex of the previous row is re-used from the mesh buffers 1412 and 1432, and drawn, as indicated at step S10, and as shown at vertex 2, processing number 9' of FIG. 7. The working registers 1414 are not re-loaded.

If the quad split bit is asserted, the next vertex of the previous row (namely vertex 2, processing number 8 in FIG. 6) is re-used by performing a mesh buffer re-use operation, and drawn, as indicated at step S11. The working registers 1414 are not re-loaded. Thereafter, as shown in steps S12 and S13, the next vertex of the current row is parsed from the compressed geometry stream 1400, its attributes pushed into the mesh buffers 1412 and 1432, and drawn. In FIG. 6, this corresponds to vertex 7, processing number 9. It should be noted that some primed processing numbers in FIG. 7 are located at the same positions within the vertex raster as their non-primed counterparts in FIG. 6. For these processing numbers, the processing is the same whether the quad split bit is asserted or not.

At step S14, it is determined whether the current vertex is the last vertex of the row. If not, step S7 is repeated, and the processing proceeds according to FIG. 6 or 7, depending on whether the quad split bit is asserted, and the above-described process is repeated. At step S15, it is determined whether the last vertex of the current row is the last vertex of the vertex raster. If not, the first vertex of the current row is re-used from the mesh buffers 1412 and 1432, and drawn. This corresponds to processing numbers 16, 26 and 36 in FIG. 6 and 16', 26' and 36' in FIG. 7. The above-described process is then also repeated until it is determined in step S15 that the last vertex of the vertex of the vertex raster has been reached, whereupon the method ends at step S16.

As can be appreciated, for each quad (four vertices, such as vertices 1, 2, 6 and 7), two triangles are formed. Indeed, for the quad defined by vertices 1, 2, 6 and 7, triangles defined by vertices (1, 2, 6) and (2, 6, 7) are formed in FIG. 6 and triangles (1, 6, 7) and (1, 2, 7) are formed in FIG. 7. Indeed, a triangle is formed from each three consecutive vertices that are drawn. By recursively following the method illustrated in FIG. 8 to traverse the vertex raster shown in FIG. 1, a sequence of triangles is generated.

A half resolution edge, according to the present invention, affects the order of processing of two rows or columns of a vertex raster, namely a row or column along the edge of the raster and a next adjacent interior row or column. Indeed, a bottom half resolution edge affects the generation of triangles and thus the processing of the bottom two rows, whereas a top half resolution edge affects the processing of the two top-most rows. Similarly, a left half resolution edges affects the processing of the two left-most columns of vertices, whereas a right half resolution edge affects the processing of the two right-most columns. In all cases, the processing of the remaining rows or columns is unaffected, and proceeds as is shown in FIGS. 6 or 7, by carrying out the method detailed in FIG. 8. The half resolution edges are independent of one another, and may exist singly, or in combination. Indeed, a vertex raster according to the present invention may have 1, 2, 3 or 4 half resolution edges and the processing thereof would be carried out in the manner to be described below.

Figure 5:
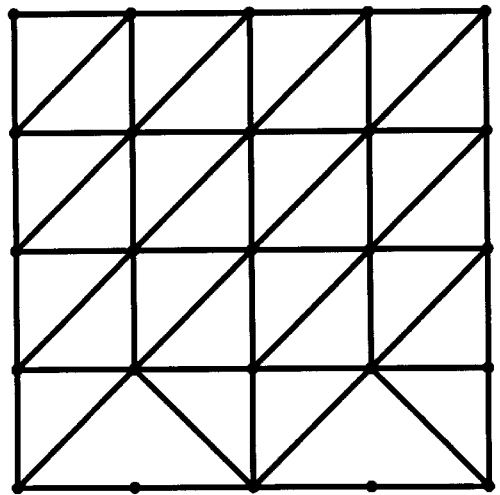
FIG. 5 is a graphical representation of a vertex raster having a bottom half resolution edge.
Figure 9:
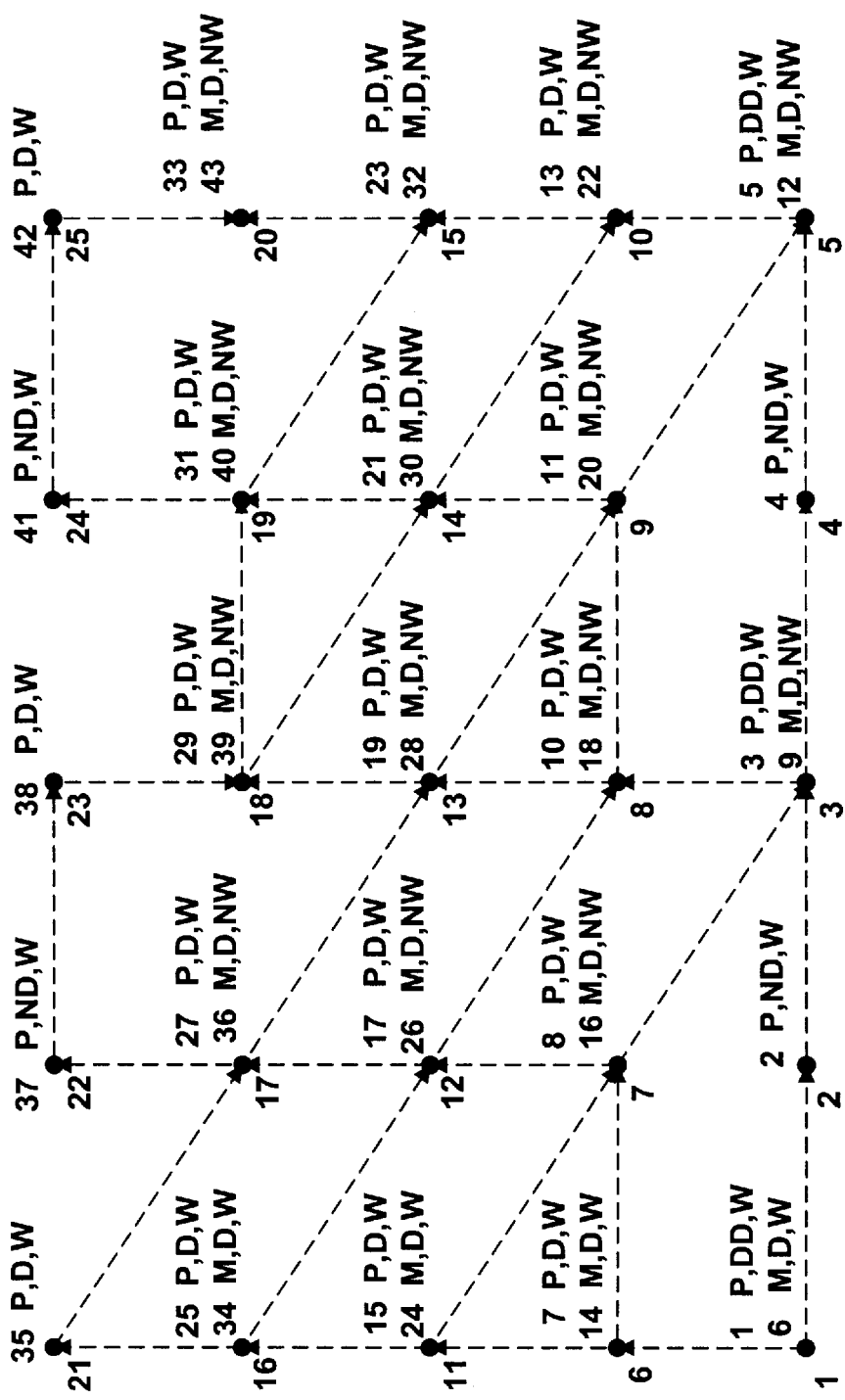
FIG. 9 shows a vertex traversal for a 5×5-vertex raster with both a top and a bottom half resolution edge, with all quad split bits asserted, according to an embodiment of the present invention.
Figure 10:
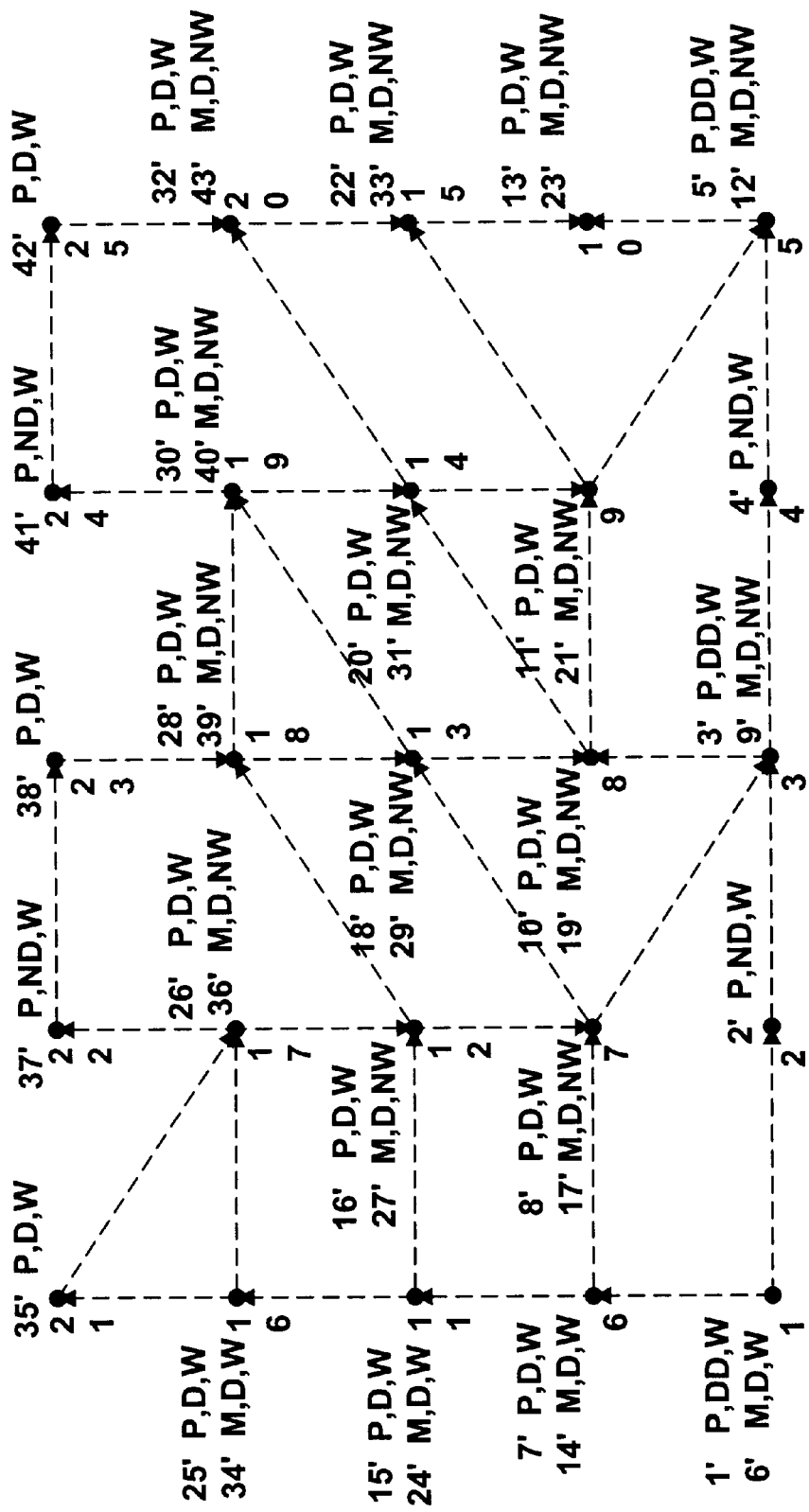
FIG. 10 shows a vertex traversal for a 5×5-vertex raster with both a top and a bottom half resolution edge, with all quad split bits not asserted, according to an embodiment of the present invention.

FIGS. 9 and 10 illustrate vertex raster traversals for vertex rasters having both a top half resolution edge, as shown in FIG. 4, and a bottom half resolution edge, as shown in FIG. 5. In FIG. 9, all of the quad split bits are asserted, whereas all of the quad split bits are not asserted in FIG. 10. The generation of triangles for a vertex raster having only a bottom half resolution edge will be explained with reference to FIGS. 9, 10 and 11. The method, according to the illustrated embodiment, starts at step S0. As shown in step S1, the first vertex of the first row is parsed from the compressed geometry stream 1400. It is then pushed into the mesh buffers 1412 and 1432, not drawn and loaded into the working registers 1414 as shown in step S2. This corresponds to vertex 1, processing number 1, codes P, DD, W in FIG. 9. In step S3, the next vertex, vertex 2, is parsed from the compressed geometry stream 1400, and its attributes dropped, as evidenced by its ND or No Data code. That is, the attributes of vertex 2, while pushed in to the mesh buffer 1412 of the GDC 1410, are not pushed or written into the mesh buffer 1432 of the rasterizing section 1430. Instead, an entry is allocated in the mesh buffer 1432, which entry acts as a placeholder for the dropped vertex, so as not to disrupt the offset between the constituent elements of the vertex raster. This will facilitate the calculation of the indices of the vertices in the mesh buffer 1432 without regard as to whether the vertex raster has a bottom half resolution edge. This dropped vertex, as shown in step S4, is not drawn. Steps S5 and S6 are then carried out, and the next vertex is parsed from the geometry stream 1400, its attributes are pushed into the mesh buffer, and the vertex is not drawn. Until the last vertex of the row is reached, as shown in step S7, the method returns to step S3, alternating between pushing vertex attributes into the mesh buffers 1412 and 1432 and dropping vertices, all without drawing any vertices.

When the end of the first row is reached, at the YES branch of step S7, the first vertex of the current row is re-used from the mesh buffers 1412 and 1432, as shown in step S8, corresponding to processing number 6 of FIG. 9 and 6' of FIG. 10. This vertex is the start of the first triangle to be drawn. Unlike the other mesh buffer re-use operations, the mesh buffer re-uses shown in processing numbers 6, 14, 24 and 34 and their corresponding primed processing numbers, re-load the working registers 1414 of the GDC 1410. This is because the attributes of the vertices at processing numbers 7, 7', 15, 15', 25, 25' and 35, 35' may depend upon the attributes of the vertices at processing numbers 1, 1', 7, 7', 15, 15' and 25, 25', respectively. Hence, the attributes of the first vertices of all but the last row are pushed into the mesh buffers 1412 and 1432 and loaded from the mesh buffer 1412 of the GDC 1410 into the working registers 1414, as shown at step S9.

Figure 11:
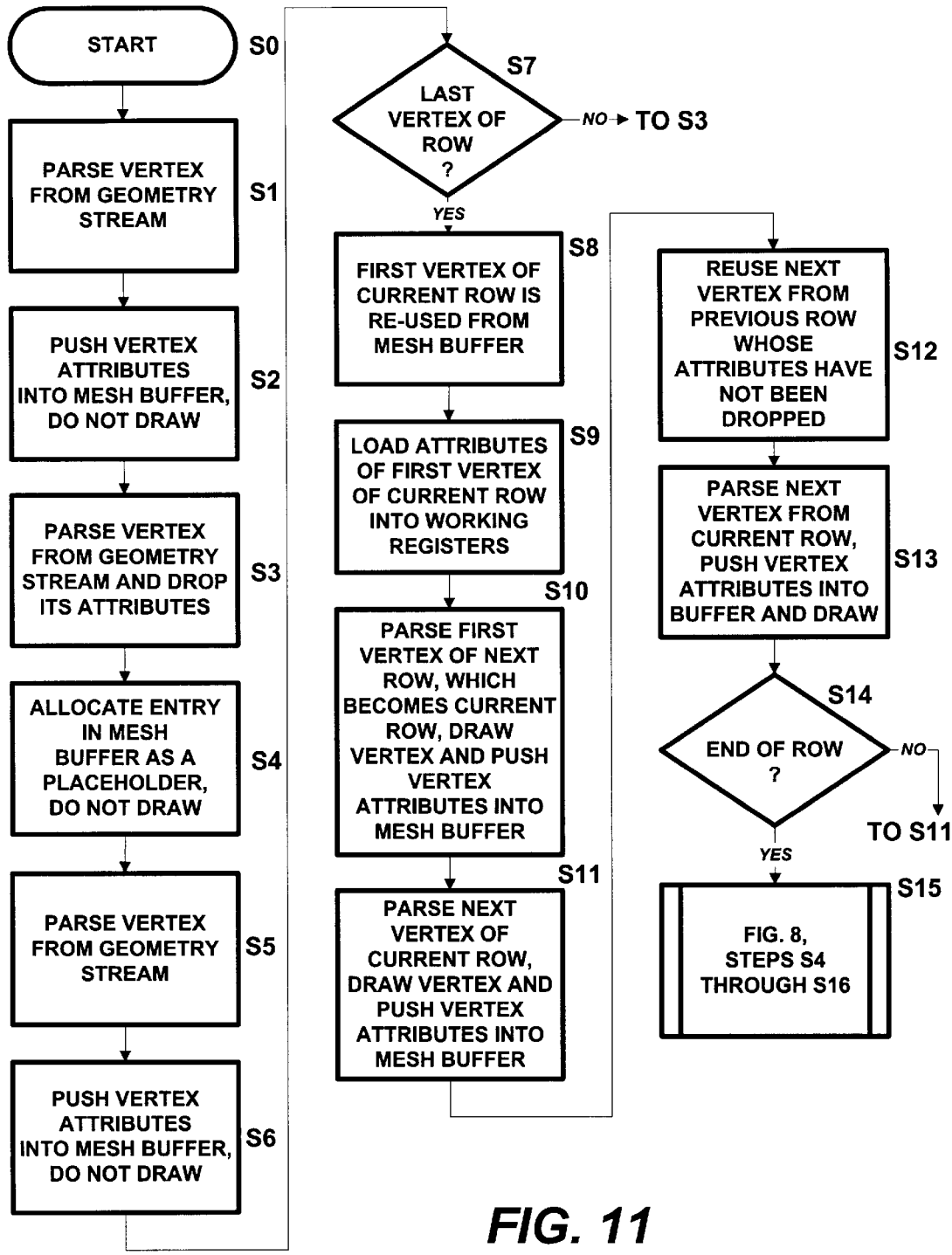
FIG. 11 is a flow diagram illustrating a sequence of steps for traversing a vertex raster having a bottom half resolution edge, according to an embodiment of the present invention.

Next, the first vertex of the next row is parsed from the compressed geometry stream 1400. This row now becomes the current row, for purposes of further processing and generation of triangles. The attributes of this vertex, according to step S10, are pushed into the mesh buffers 1412 and 1432, drawn and loaded into the working registers 1414. With reference to FIG. 9, this corresponds to vertex 6, processing number 7, codes P, D, W. As shown at step S11, the next vertex of the current row is parsed from the compressed geometry stream 1400, its attributes pushed into the mesh buffers 1412 and 1432 and drawn, as shown at vertex 7, processing number 8 in FIG. 9 and as vertex 7, processing number 8' in FIG. 10. Then, the next vertex of the previous row whose attributes have not been dropped is re-used, as shown in FIG. 11 at step S12. The previous row, in this case, is the first row, and the next vertex of that row whose attributes have not been dropped is vertex 3. This complete the generation of a large triangle defined by vertices (1, 7, 3) on the first row. As can be seen, a large triangle located in a half resolution edge spans the dropped vertex along one of its edges. Thereafter, as shown at step S13, the next vertex of the current row is parsed from the compressed geometry stream 1400, its attributes pushed into the mesh buffers 1412 and 1432, and drawn. The procedure, as shown at step S14, then repeats until the end of the row is reached. The remaining rows, as shown by step S15, are processed as shown in FIG. 8, which illustrates vertex raster traversal when there are no half resolution edges. This assumes that there is no top half-resolution edge present in the vertex raster, contrary to the situation shown in FIGS. 9 and 10.

Figure 12:
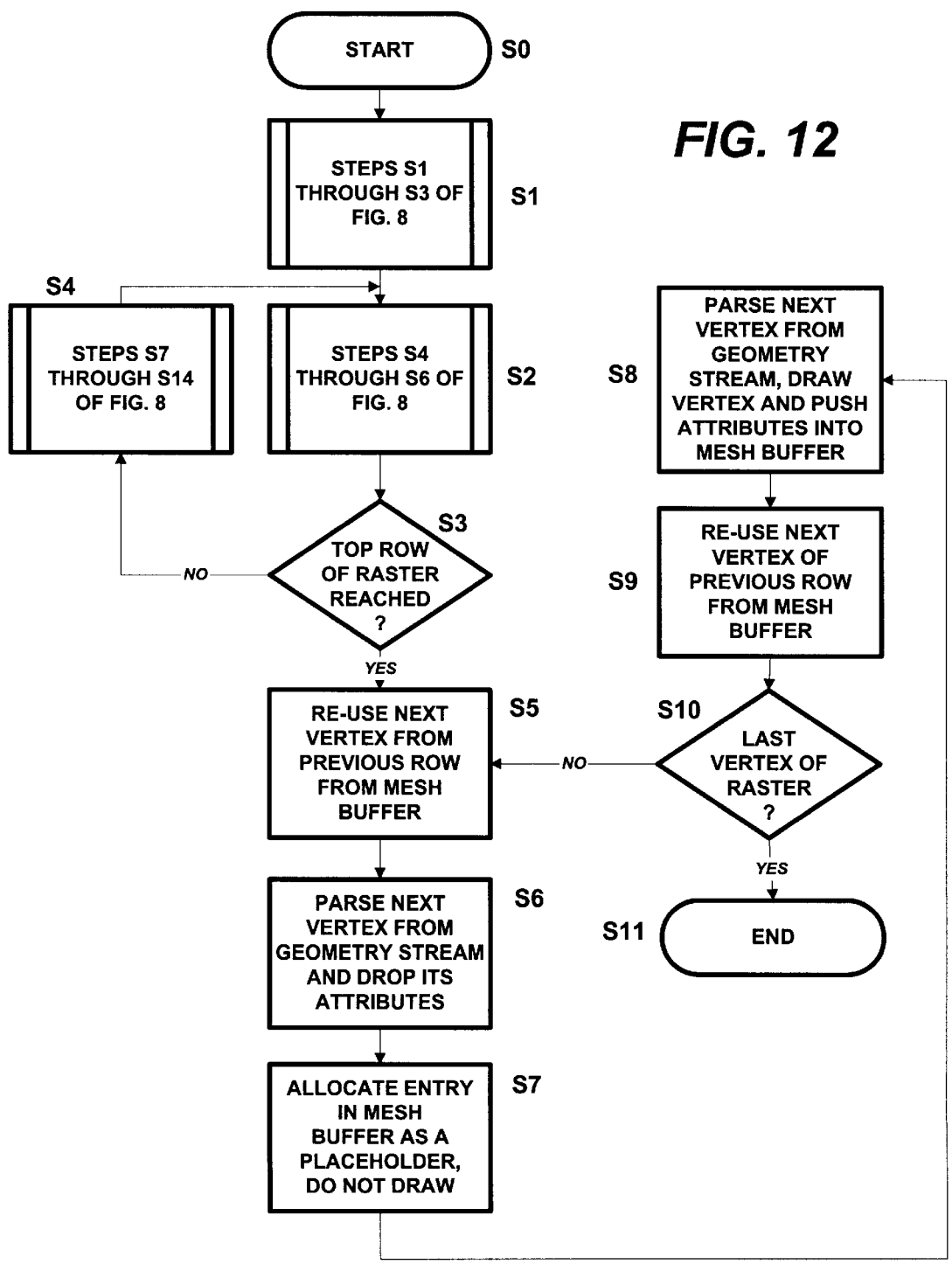
FIG. 12 is a flow diagram illustrating a sequence of steps for traversing a vertex raster having a top half resolution edge, according to an embodiment of the present invention.

The processing of a vertex raster having only a top half resolution edge is illustrated in FIG. 12, with reference to FIGS. 9 and 10. As shown in steps S0 through S4, all of the rows except the last row are processed in the manner shown in FIG. 8, which illustrates a vertex traversal for a vertex raster without any half-resolution edges. When the top row is reached, at the YES branch of step S3, the next vertex from the previous row, corresponding to vertex 17, processing numbers 36 or 36', is re-used from the mesh buffers 1412 and 1432, as shown in step S5. According to step S6, the next vertex is parsed from the compressed geometry stream 1400 and its attributes are dropped. In FIGS. 9 and 10, this next vertex is vertex 22, processing numbers 37, 37', respectively, codes P, ND, W for push attributes into the mesh buffers, no data and load working registers 1414. In step S7, an entry as a placeholder is allocated in the mesh buffer for this vertex. Then, as shown at step S8, the next vertex from the current row, corresponding to vertex 23, processing numbers 38, 38' is parsed from the compressed geometry stream 1400, drawn, and its attributes pushed into the mesh buffers 1412 and 1432. Then, according to step S9, the next vertex of the previous row, vertex 18, is re-used from the mesh buffers 1412 and 1432. In step S10, it is determined whether the vertex just parsed from the compressed geometry stream 1400 was the last vertex of the vertex raster. If not, the method reverts to step S5, and the next vertex from the previous row, vertex 19, is re-used from the mesh buffers 1412 and 1432, whereupon the cycle described above repeats. When the last vertex of the raster has been reached and the large triangle defined by vertices (23, 19, 25) has been formed, the vertex traversal and hence the generation of the sequence of triangles ends at step S14.

Figure 13:
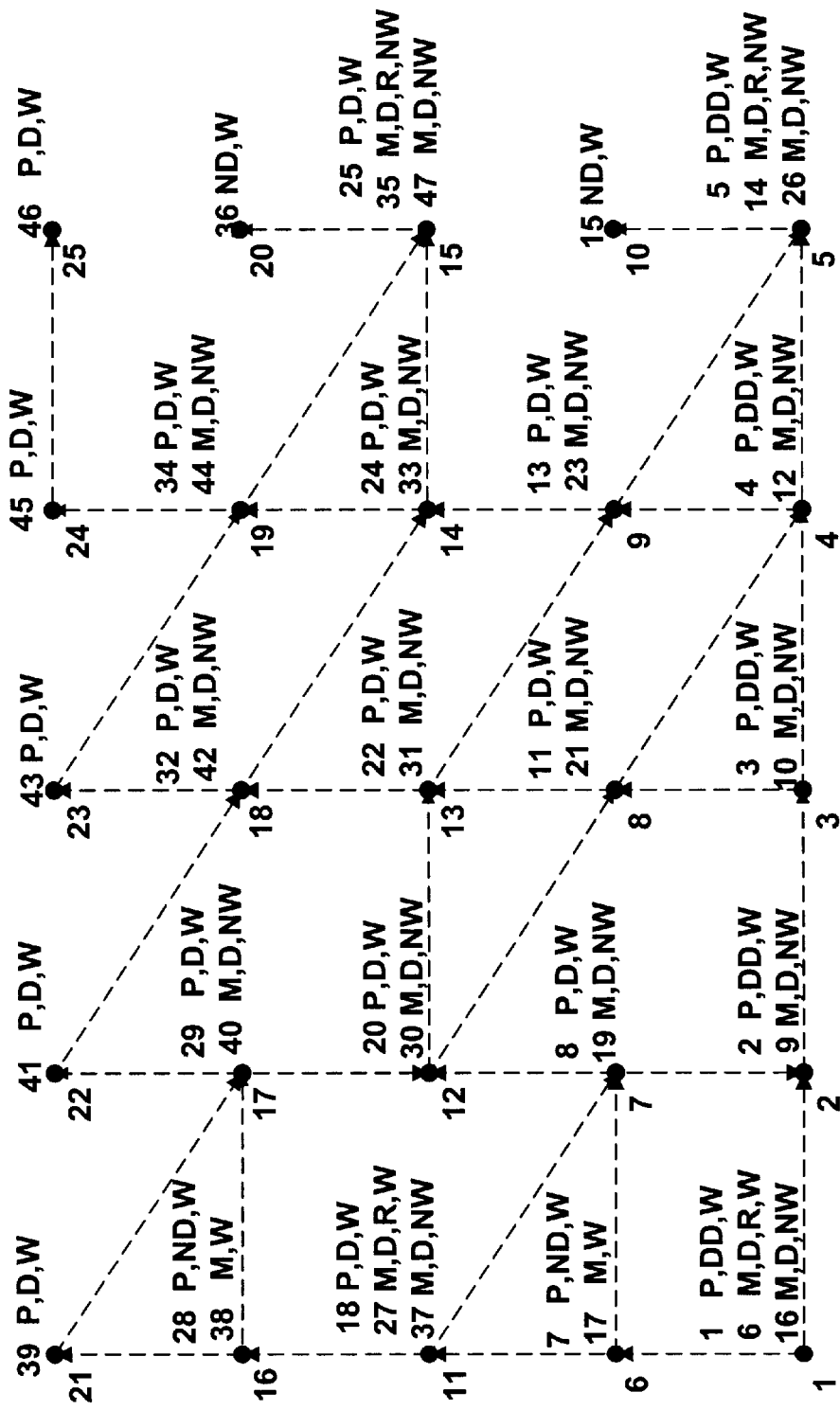
FIG. 13 shows a vertex traversal for a 5×5-vertex raster with both left and right half resolution edges and with all quad split bits asserted, according to an embodiment of the present invention.
Figure 14:
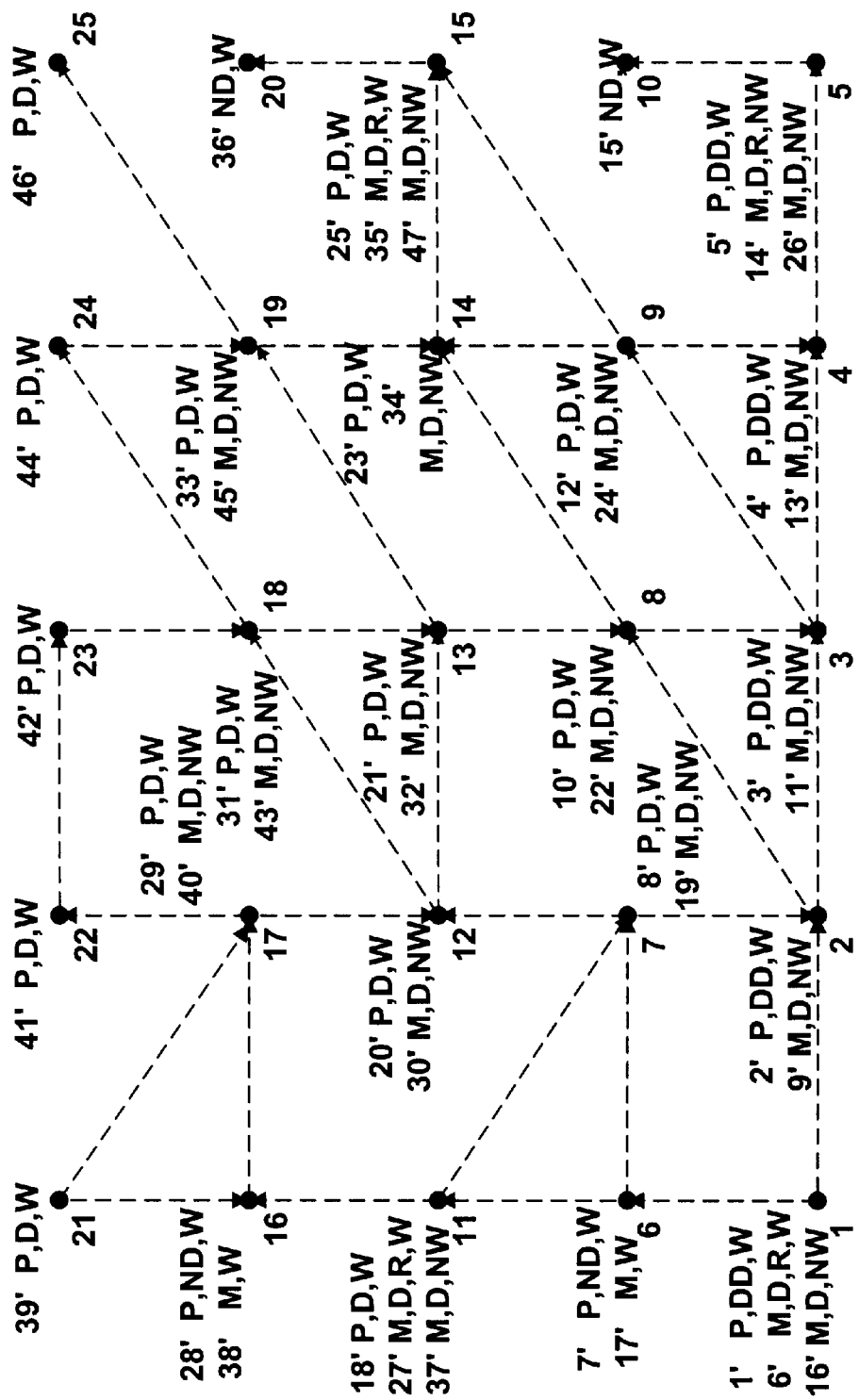
FIG. 14 shows a vertex traversal for a 5×5-vertex raster with both left and right half resolution edges and with all quad split bits not asserted, according to an embodiment of the present invention.
Figure 15:
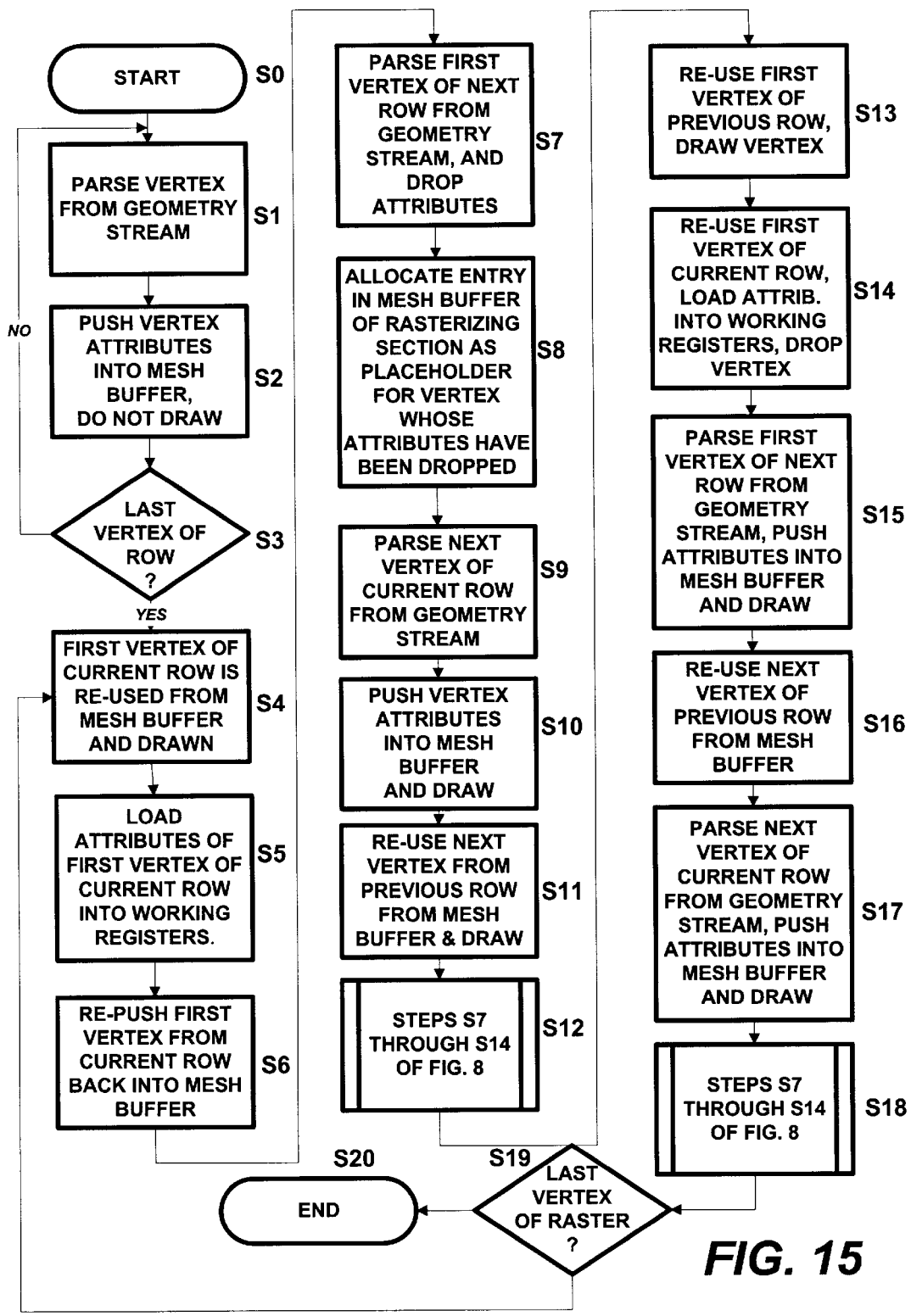
FIG. 15 is a flow diagram illustrating a sequence of steps for traversing a vertex raster having a left half resolution edge, according to an embodiment of the present invention.

FIG. 13 illustrates a vertex raster traversal according to one embodiment of the present invention, wherein the vertex raster includes a left and a right half resolution edge and wherein all of the quad split bits are asserted. FIG. 14 illustrates a vertex raster traversal according to one embodiment of the present invention, wherein the vertex raster includes a left and a right half resolution edge and wherein none of the quad split bits are asserted (all of the quad split bits are not asserted). Of course, the quad split bits may switch from asserted to non-asserted at any time during the vertex traversal. In that case, the order of processing would continue from the current point onward, following the primed or non-primed processing numbers, as appropriate. FIG. 15 is a flow chart illustrating one embodiment of the method according to the present invention wherein the vertex raster to be traversed includes only a left half resolution edge.

Considering FIGS. 13, 14 and 15 collectively, the method and the vertex traversal begins at step S0. The first row of the vertex raster is processed as shown in steps S1 through S3 of FIG. 8, in the same manner as when there are no half resolution edges. The detailed description of these steps is incorporated herewith by reference, as if repeated in full. In step S4, the first vertex of the current row is re-used from the mesh buffers 1412 and 1432 and drawn. The working registers 1414 are loaded with the attributes of the first vertex of the current row just pushed into the mesh buffer 1412. As this vertex is the first vertex of the larger triangle defining a portion of the left half resolution edge, and may be overwritten by subsequent mesh buffer pushes, its attributes are re-pushed into another location of the mesh buffers 1412, 1432 to insure that they will be available when needed to form the triangle having vertices (1, 7, 11). This step is shown in FIG. 15 at S6. This ability to re-push vertex attributes back into the mesh buffers 1412, 1432 after a mesh buffer re-use operation is important, since the mesh buffers 1412, 1432 would otherwise have to be much larger to insure that this vertex will not be overwritten by other vertices that will subsequently be pushed into the mesh buffers.

Next, the first vertex of the next row is parsed from the compressed geometry stream 1400, and its attributes dropped. That is, although its attributes are pushed into the mesh buffer 1412 of the GDC 1410, they are not pushed into the mesh buffer 1432 of the rasterizing section 1430, as this vertex will not be drawn. Nevertheless, an entry functioning solely as a placeholder is allocated in the mesh buffer 1432 for this vertex, so as not to disrupt the offset between the constituent vertices of the vertex raster. This step is shown at S8. At step S9, the next vertex from the current row, vertex 7, processing number 8, is parsed from the compressed geometry stream 1400. The attributes of this vertex are pushed into the mesh buffers 1412 and 1432 and drawn in step S10. Thereafter, vertex 2, processing number 9 is re-used from the mesh buffers 1412 and 1432 and drawn, without re-loading the working registers 1414.

Up to this point in the traversal of the vertex raster, there has been no distinction between FIG. 13, wherein all of the quad split bit are asserted and FIG. 14, where the quad split bits are all not-asserted. This, however, changes after the mesh buffer re-use of vertex 2, processing number 9. Indeed, after this mesh buffer re-use, it is determined whether the quad split bit is asserted. Thereafter, the appropriate traversal steps are made depending upon the result of this determination. Indeed, steps S7 through S14 of FIG. 8 are carried out as previously described. The description of these steps is, therefore, incorporated herewith as if repeated here in full.

When the last vertex of the current row is reached, according to the YES branch of step S14 of FIG. 8, step S13 of FIG. 15 is carried out, and the first vertex of the previous row is re-used from the mesh buffers 1412 and 1432, and drawn. This corresponds to vertex 1, processing number 16. This vertex is available in the mesh buffers 1412 and 1432, because it was re-pushed in processing number 6. Had the vertex attributes of vertex 1 not been repushed in processing number 6, they would have been overwritten in the mesh buffers 1412 and 1432 by subsequent mesh buffer push operations. In step S14, the first vertex of the current row is re-used from the mesh buffer 1412, its attributes loaded into the working registers 1414. This corresponds to vertex 6, processing number 17. Next, in step S15, the first vertex of the next row is parsed from the compressed geometry stream 1400, its attributes pushed into the mesh buffer 1412 and 1432 and drawn. This is vertex 11, processing number 18. Then, at step S17, the next vertex of the previous row, vertex 7, processing number 19 is re-used from the mesh buffers 1412 and 1432. This completes the larger triangle defined by the vertices (1, 7, 11). Finally, the next vertex of the current row is parsed from the compressed geometry stream 1400, its attributes pushed into the mesh buffers 1412 and 1432 and drawn. This corresponds to vertex 12, processing number 20. The remaining portion of the row is then processed as if there were no half-resolution edges, as depicted at step S18 of FIG. 15. The procedure is then repeated until the last vertex of the raster has been reached, as shown at step S19, whereupon the vertex traversal according to the present invention ends at step S20.

Lastly, a vertex raster may have a right half resolution edge, as shown in both FIGS. 13 and 14. The method of traversing a vertex raster with only a right half resolution edge is shown in the flow diagram of FIG. 16.

Figure 16:
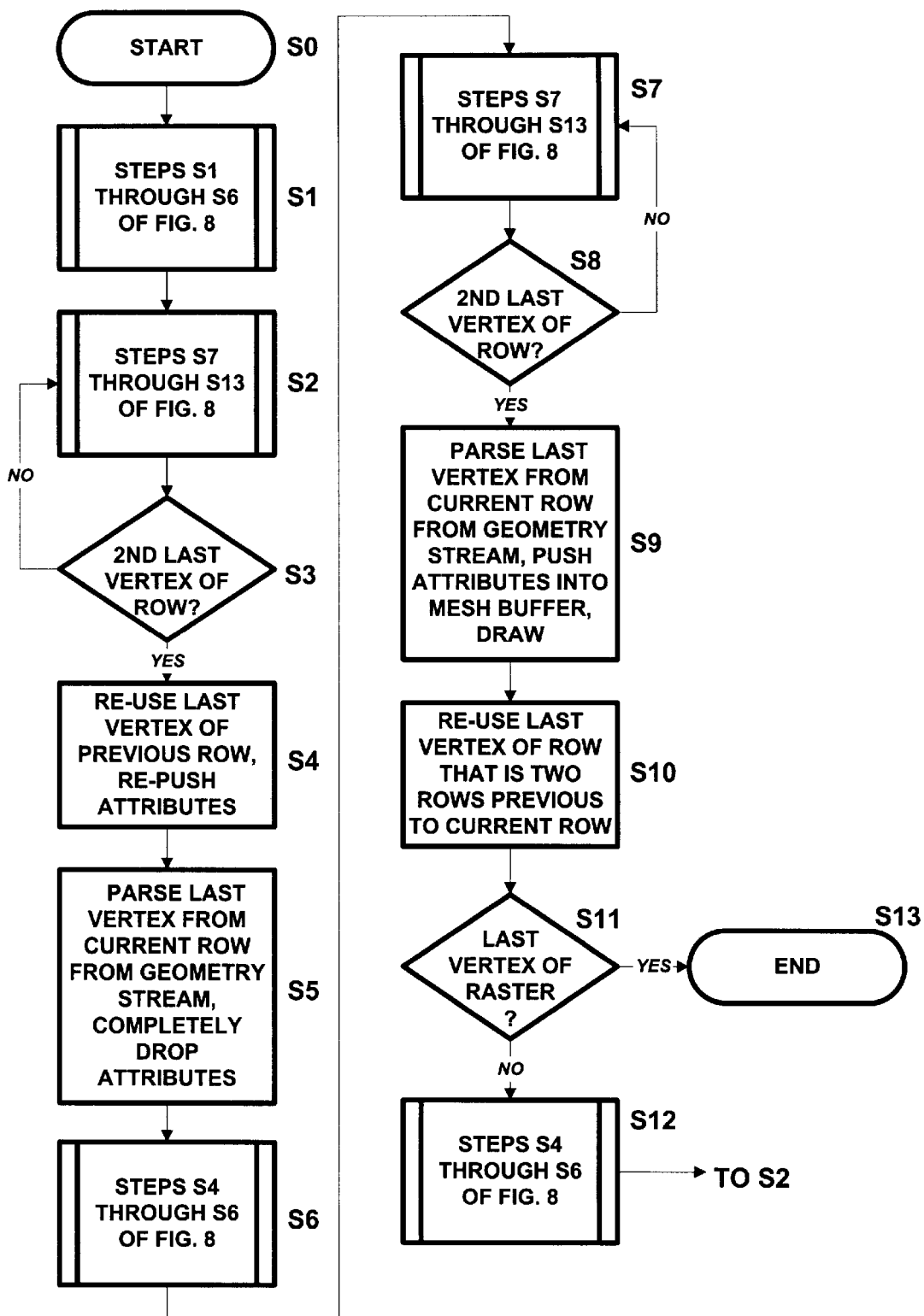
FIG. 16 is a flow diagram illustrating a sequence of steps for traversing a vertex raster having a right half resolution edge, according to an embodiment of the present invention.

As shown in FIG. 16, the method of traversing a vertex raster having a right half resolution edge begins with step S0. As shown in steps S1 and S2, the first row of the raster is processed as if there were no half resolution edges present. Similarly for the second row until the second to last vertex of the row, as shown in step S3 of FIG. 16. The detailed description of these steps of FIG. 8 is omitted, but is nevertheless incorporated herewith by reference as if repeated in full. After processing the second to last vertex from either the current row (quad split bit not asserted) or the previous row (quad split bit asserted), the last vertex from the previous row is re-used from the mesh buffers 1412 and 1432, and its attributes re-pushed back into the mesh buffers 1412 and 1432 at another location, as indicated at step S4. This is the entry in the mesh buffers 1412 and 1432 that the last vertex in the second row would normally occupy. Then, this last vertex from the current row is parsed from the compressed geometry stream 1400 and its attributes completely dropped (never sent to rasterizing section 1430), as shown at step S5. The third row is then processed as shown in steps S6 and S7, meaning according to steps S4 through S13 of FIG. 8. The detailed description of these steps is incorporated herewith as if repeated here in full. Then, in step S8, it is determined whether the second to last vertex of the row has been reached. If not, step S7 is repeated until this vertex is reached. When this vertex has been reached, according to step S9, the last vertex from the current row is parsed from the geometry stream, its attributes pushed into the mesh buffers 1412 and 1432, and drawn. This corresponds to vertex 15, processing numbers 25, 25'. Then, as shown at step S10, the last vertex of the row that is two rows previous to the current row is re-used and drawn. This corresponds to the last vertex of the first row, or vertex 5, processing number 26, 26'. This completes the first large triangle defining a portion of the right half resolution edge. Since processing numbers 26, 26' are in the usual slot in the mesh buffer normally associated with the last vertex of the previous row, processing numbers 26, 26' look like normal processing. As indicated at steps S11 and S12, the procedure is repeated for all rows until the last vertex of the vertex raster has been processed, whereupon the processing ends at step S13. Indeed, if the last vertex of the raster has not been processed, steps S4 through S6 of FIG. 8 are carried out, followed by a return to step S2, until the last vertex has been processed.

It is to be understood that the flow diagrams described above may readily be combined to process vertex rasters having several half-resolution edges, without departing from the spirit of the present invention.

Moreover, although not explicitly illustrated, the attributes of each vertex that is parsed from the compressed geometry stream 1400 are loaded into the working registers 1414. For the mesh buffer re-use operations, however, unless explicitly stated, only those mesh buffer re-use operations that act on the first vertex of a given row re-load the working registers, as the attributes thereof are needed to interpolate the attributes of subsequent vertices in the first column. This re-loading of the working registers 1414 from the mesh buffers 1412 is depicted in FIG. 17 by the arrow in dash lines joining the mesh buffer 1412 to the working registers 1414.

While the foregoing detailed description has described preferred embodiments of the present invention, it is to be understood that the above description is illustrative only and not limiting of the disclosed invention. For example, less than optimally sized mesh buffers may be utilized, thus obviating the need of, for example, the mesh buffer re-push operations. Moreover, the vertex raster may be different from the example shown in the drawings. For example, the order of the vertices may differ from that illustrated, such that the first vertex is located at the upper left, bottom right or top right corner of the array. The number of vertices in the rows of the raster may be different than the number of vertices in the columns of the raster, to thereby define rectangular arrays of vertices. Further modifications will occur to those of skill in this art, and all such modifications are deemed to fall within the scope of the present invention. Thus, the invention is to be limited only by the claims as set forth below.

What is claimed is:

1. A method of producing a sequence of triangles from a geometry stream containing an array of vertices, comprising the steps of:

parsing vertices from the geometry stream and pushing the parsed vertices into a mesh buffer until a last vertex of a current row of the array is parsed and pushed;

re-using a first vertex of the current row from the mesh buffer and drawing the re-used first vertex;

parsing a first vertex of a next row from the geometry stream, pushing the first vertex into the mesh buffer and drawing the first vertex;

determining if a quad split bit is asserted;

when the quad split bit is not asserted, parsing a next vertex from a current row of the array, pushing the parsed next vertex into the mesh buffer, drawing the parsed next vertex, and re-using a next vertex of a previous row from the mesh buffer and drawing the re-used next vertex;

when the quad split bit is asserted, re-using the next vertex of the previous row from the mesh buffer and drawing the re-used next vertex, parsing and drawing the next vertex of the current row of the array and pushing the parsed next vertex of the current row into the mesh buffer; and returning to the determining step until the last vertex of the current row is reached, and returning to the first vertex re-using step until a last vertex of the array of vertices is reached, whereby, a triangle is formed from each three consecutive drawn vertices, to thereby create the sequence of triangles, starting from the beginning of each row.

2. The method of producing a sequence of triangles according to claim 1, wherein none of the vertices of a first row of the array are drawn until the re-using step.

3. The method of producing a sequence of triangles according to claim 1, further including a step of loading the first vertex of the current row into working registers from the mesh buffer following the first vertex re-use step, to interpolate the first vertex of the next row therefrom.

4. The method of producing a sequence of triangles according to claim 1, wherein each of the vertices includes a plurality of attributes and wherein along a half resolution edge, vertices that are pushed into the mesh buffer and drawn alternate with vertices that are not drawn and for which only placeholders devoid of attributes are pushed into the mesh buffer.

5. The method of producing a sequence of triangles according to claim 1, wherein, to create a half resolution edge along a bottom row of the array, every other vertex along the bottom row is dropped and a placeholder therefor is pushed into the mesh buffer and wherein remaining vertices of a bottom and next adjacent row are processed by omitting a first and every other next vertex re-using and drawing step, and by modifying the next vertex re-using step to re-use only vertices from the previous row that have not been dropped.

6. The method of producing a sequence of triangles according to claim 1, wherein, to create a top half resolution edge, upon reaching a top row of the array, the following steps are carried out until the last vertex of the array of vertices is reached:

re-using a first vertex of the previous row from the mesh buffer, parsing the first vertex of the top row from the geometry stream, drawing the parsed first vertex and pushing the parsed first vertex into the mesh buffer, re-using the next vertex of the previous row from the mesh buffer, parsing the next vertex from the geometry stream and dropping the parsed next vertex, allocating an entry in the mesh buffer as a placeholder for the dropped next vertex, and not drawing the dropped next vertex, parsing the next vertex from the geometry stream, drawing the parsed next vertex and pushing the parsed next vertex into the mesh buffer and re-using the next vertex of the previous row from the mesh buffer.

7. The method of producing a sequence of triangles according to claim 6, wherein each of the vertices includes a plurality of attributes and wherein the first vertex of the previous row re-using step loads the attributes of the re-used vertex into working registers.

8. The method of producing a sequence of triangles according to claim 1, wherein to create a left half resolution edge, upon reaching a last vertex of a first row of the array, the following steps are carried out until the last vertex of the array of vertices is reached:

re-using the first vertex of current row from the mesh buffer and drawing first vertex;

re-pushing the re-used first vertex into the mesh buffer;

parsing first vertex of next row from geometry stream, and dropping the parsed first vertex;

allocating an entry in the mesh buffer as a placeholder for the dropped first vertex;

parsing next vertex of current row from geometry stream, pushing the parsed next vertex into mesh buffer and drawing the parsed next vertex;

re-using the next vertex of the previous row from the mesh buffer and drawing the re-used next vertex;

returning to the determining step until a last vertex of the current row is reached;

re-using first vertex of previous row from the mesh buffer and drawing re-used first vertex;

re-using the first vertex of the current row from the mesh buffer and not drawing the re-used first vertex of the current row parsing first vertex of next row from geometry stream and pushing parsed first vertex into the mesh buffer and drawing parsed first vertex;

re-using next vertex of previous row from the mesh buffer;

parsing next vertex of current row from geometry stream, pushing next vertex of current row into the mesh buffer and drawing pushed next vertex, and returning to the determining step until the last vertex of the current row is reached.

9. The method of producing a sequence of triangles according to claim 1, wherein, to create a right half resolution edge, upon reaching a second to last vertex of a second row of the array, the following steps are carried out until the last vertex of the array of vertices is reached:

re-using a last vertex of a previous row, and re-pushing re-used last vertex into the mesh buffer;

parsing last vertex of current row from the geometry stream, and completely dropping the last vertex of current row;

returning to the first vertex of the current row re-using step;

returning to the determining step until the second to last vertex of the current row is reached, parsing the last vertex of the current row from the geometry stream, pushing parsed last vertex into the mesh buffer, re-using last vertex of row that is two rows previous to current row, and returning to the first vertex of the current row re-using step, to the determining step and to the last vertex of previous row re-using step until the last vertex of the array is reached.

10. The method of producing a sequence of triangles according to claim 9, wherein, when a vertex is completely dropped, no vertex and no placeholder mesh buffer pushing step is carried out.

11. The method of producing a sequence of triangles according to claim 1, wherein each re-using step includes a step of selectively reading a plurality of vertex attributes stored in the mesh buffer without re-loading working registers.

12. A method of generating a sequence of triangles from a compressed geometry stream containing an array of vertices, each of the vertices including a plurality of attributes, comprising the steps of:

traversing the array and selectively issuing, for each vertex of the array, one of a draw command and a don't draw command, and by carrying out at least one of a vertex drop step, to drop the attributes of selected vertices of the array, a mesh buffer pushing step, to push the attributes of selected vertices of the array into a mesh buffer, a mesh buffer re-use step, to read vertex attributes previously pushed into the mesh buffer, a working registers load step, to load vertex attributes into working registers, and a mesh buffer re-push step, to read vertex attributes previously pushed into the mesh buffer and to re-push the attributes in another location of the mesh buffer; and during the traversing step, decompressing the geometry stream by utilizing attributes of vertices loaded into the working registers, the loaded working registers storing vertex attributes to allow interpolation of attributes of subsequent vertices in the geometry stream therefrom, whereby a plurality of triangles is generated to form the sequence, each of the plurality of triangles being defined by three consecutive vertices for which a draw command has been issued, starting from the beginning of each row.

13. A method of generating triangles according to claim 12, wherein the vertex drop step drops attributes of selected vertices located on at least one edge of the array of vertices by pushing only a placeholder devoid of attributes into the mesh buffer, thereby creating at least one edge having dropped vertices, resulting in at least one half resolution edge defining triangles of larger size than triangles located in an interior of the array.

14. A method of generating triangles according to claim 13, wherein the selected vertices are every alternate vertex along the at least one edge of the array of vertices.

15. A method of generating triangles according to claim 12, wherein the working register load steps includes a step of selectively loading vertex attributes from the mesh buffer following a mesh buffer re-use step.

16. A method of generating triangles according to claim 12, wherein the mesh buffer re-push step is carried out when subsequent mesh buffer push operations would overwrite vertex attributes that were previously pushed into the mesh buffer and that will be subsequently needed for later mesh buffer re-use operations, whereby, a smaller mesh buffer may be used than would be possible without the mesh buffer re-push step.

17. A method of generating triangles according to claim 12, wherein for each vertex of the first row of vertices of the array, a don't draw command is issued, and a mesh buffer pushing step is carried out, to store the attributes thereof into the mesh buffer for a subsequent mesh buffer re-use step.

* * * * *